United States Patent
Gonzalez Sanchez et al.

(10) Patent No.: US 12,450,152 B2
(45) Date of Patent: Oct. 21, 2025

(54) PROVIDING APPLICATION ERROR DATA FOR USE BY THIRD-PARTY LIBRARY DEVELOPMENT SYSTEMS

(71) Applicant: Google LLC, Mountain View, CA (US)

(72) Inventors: Alberto Gonzalez Sanchez, London (GB); Ioannis Ilkos, London (GB); Dino Derek Hughes, London (GB)

(73) Assignee: Google LLC, Mountain View, CA (US)

( * ) Notice: Subject to any disclaimer, the term of this patent is extended or adjusted under 35 U.S.C. 154(b) by 138 days.

(21) Appl. No.: 18/249,758

(22) PCT Filed: Nov. 9, 2020

(86) PCT No.: PCT/US2020/059707
§ 371 (c)(1),
(2) Date: Apr. 20, 2023

(87) PCT Pub. No.: WO2022/086571
PCT Pub. Date: Apr. 28, 2022

(65) Prior Publication Data
US 2023/0409468 A1 Dec. 21, 2023

(30) Foreign Application Priority Data
Oct. 22, 2020 (GR) .................. 2020-04014

(51) Int. Cl.
G06F 11/3698 (2025.01)
G06F 11/362 (2025.01)

(52) U.S. Cl.
CPC ...... G06F 11/3698 (2025.01); G06F 11/3636 (2013.01)

(58) Field of Classification Search
CPC ................. G06F 11/3636; G06F 11/3698
See application file for complete search history.

(56) References Cited

U.S. PATENT DOCUMENTS 8,473,251 B1  6/2013  Noth et al.
8,645,763 B2  2/2014  Szegedi et al.
(Continued)

FOREIGN PATENT DOCUMENTS

CN  103645985 A  3/2014
CN  110554875 A  12/2019
(Continued)

OTHER PUBLICATIONS

First Examination Report from counterpart Indian Application No. 202347032712 dated Apr. 25, 2024, 6 pp.
International Preliminary Report on Patentability from International Application No. PCT/US2020/059707 dated May 4, 2023, 7 pp.
International Search Report and Written Opinion of International Application No. PCT/US2020/059707 dated Jul. 29, 2021, 10 pp.
Response to Communication Pursuant to Rules 161(1) and 162 EPC dated May 8, 2023, from counterpart European Application No. 20853543.5, filed Nov. 8, 2023, 18 pp.
(Continued)

*Primary Examiner* — Wei Y Mui
*Assistant Examiner* — Brahim Bourzik
(74) *Attorney, Agent, or Firm* — Shumaker & Sieffert, P.A.

(57) ABSTRACT

An example method includes receiving, by an application server system and from one or more client computing devices, application error data associated with at least one error that occurred during execution of at least one application, receiving mapping data that provides a mapping between (i) library-dependent source code of the application(s) and (ii) at least one third-party library from which the library-dependent source code is loaded during execution of the application(s), determining, based on the application error data and the mapping data, a match between the library-dependent source code and at least one portion of the application error data, attributing the at least one error to the at least one third-party library, generating library error data associated with the at least one third-party library, and sending, to at least one third-party library development system, the library error data.

18 Claims, 11 Drawing Sheets

(56) References Cited

U.S. PATENT DOCUMENTS

| | | | |
|---|---|---|---|
| 9,104,797 B1 * | 8/2015 | Sekhar | G06F 11/362 |
| 9,703,680 B1 | 7/2017 | Chang et al. | |
| 9,753,444 B2 | 9/2017 | Nakagawa | |
| 9,841,969 B2 | 12/2017 | Seibert, Jr. et al. | |
| 9,846,607 B2 | 12/2017 | Spitzer et al. | |
| 10,459,828 B2 | 10/2019 | Seibert, Jr. et al. | |
| 10,606,683 B1 | 3/2020 | Culibrk et al. | |
| 2012/0089410 A1 | 4/2012 | Mikurak | |
| 2015/0154077 A1 | 6/2015 | Marra et al. | |
| 2015/0347220 A1 | 12/2015 | Hermany et al. | |
| 2016/0321124 A1 | 11/2016 | Baker et al. | |
| 2017/0123887 A1 * | 5/2017 | Bajaj | G06F 11/0754 |
| 2017/0329701 A1 * | 11/2017 | Patnaik | G06F 11/3692 |
| 2017/0371731 A1 * | 12/2017 | Khan | G06F 11/36 |
| 2018/0181482 A1 | 6/2018 | Cattan et al. | |
| 2018/0300222 A1 * | 10/2018 | Cattan | G06F 11/3065 |
| 2020/0285788 A1 | 9/2020 | Brebner | |
| 2020/0379871 A1 * | 12/2020 | Prakash | G06F 11/0769 |

FOREIGN PATENT DOCUMENTS

| | | |
|---|---|---|
| JP | 2014530392 A | 11/2014 |
| JP | 2018128867 A | 8/2018 |
| JP | 2018522317 A | 8/2018 |
| KR | 20180138130 A | 12/2018 |
| WO | 2014136228 A1 | 9/2014 |

OTHER PUBLICATIONS

Notice of Intent to Grant and Text Intended to Grant from counterpart European Application No. 20853543.5 dated Aug. 16, 2024, 62 pp.

Response to First Examination Report dated Apr. 25, 2024, from counterpart Indian Application No. 202347032712 filed Jul. 30, 2024, 8 pp.

First Office Action and Search Report, and translation thereof, from counterpart Chinese Application No. 202080107341.2 dated Sep. 14, 2024, 14 pp.

Notice of Intent to Grant and Text Intended to Grant from counterpart European Application No. 20853543.5 dated Jan. 7, 2025, 62 pp.

Notice of Intent to Grant, and translation thereof, from counterpart Japanese Application No. 2023-524718 dated Jan. 7, 2025, 6 pp.

Response to Office Action dated Sep. 14, 2024, from counterpart Chinese Application No. 202080107341.2 filed Jan. 14, 2025, 50 pp. Partial machine translation provided.

Notice of Intent to Grant, and translation thereof, from counterpart Chinese Application No. 202080107341.2 dated Jul. 1, 2025, 6 pp.

Office Action, and translation thereof, from counterpart Korean Application No. 10-2023-7016876 dated Aug. 21, 2025, 6 pp.

* cited by examiner

PROVIDING APPLICATION ERROR DATA FOR USE BY THIRD-PARTY LIBRARY DEVELOPMENT SYSTEMS

BACKGROUND

Existing computing devices, including mobile computing devices, are configured to execute any number of different applications (e.g., mobile applications, games) over time. Various different application developers may develop and distribute these applications using one or more application development systems, and these applications may then be executed by client computing devices that are associated with end users. In many cases, one or more centralized application servers may store these applications and corresponding metadata after the applications have been developed, and end users may download and use these applications on their respective client computing devices. Unfortunately, in certain situations, any given application may experience errors during its execution, and may even crash or abort execution in some cases based on the severity or type of errors that occur.

SUMMARY

The present disclosure is directed to providing one or more portions of application error data, based on one or more errors that occur during execution of one or more applications, for use by third-party library development systems that develop third-party libraries used by these applications. According to techniques of the present disclosure, an application server system may be configured to process application error data associated with such errors occurring during execution of at least one application on one or more client computing devices, and outputting at least a portion of such data, which is included within library error data, to third-party library development systems. In such fashion, a library developer of one or more third-party libraries may receive and review such library error data, which may relate to the execution of corresponding library-dependent code that is included in or used by the applications during execution. By reviewing and analyzing library error data, third-party library developers and/or third-party library development systems may attempt to identify any coding faults or other issues in the third-party libraries that may have caused runtime errors during application execution.

In one example, a method includes receiving, by an application server system including one or more processors, and from one or more client computing devices, application error data associated with at least one error that occurred during execution of at least one application on the one or more client computing devices, receiving, by the application server system, mapping data that provides a mapping between (i) library-dependent source code of the at least one application and (ii) at least one third-party library from which the library-dependent source code is loaded during execution of the at least one application, and determining, by the application server system and based on the application error data and the mapping data, a match between the library-dependent source code and at least one portion of the application error data. The example method further includes, responsive to determining the match, attributing, by the application server system, the at least one error that occurred during execution of the at least one application to the at least one third-party library, generating, by the application server system, library error data associated with the at least one third-party library, wherein the library error data includes the at least one portion of the application error data, and sending, by the application server system and to at least one third-party library development system that develops the at least one third-party library, the library error data.

In another example, an application server system includes at least one processor and at least one computer-readable storage device configured to store instructions that are executable by the at least one processor to: receive, from one or more client computing devices, application error data associated with at least one error that occurred during execution of at least one application on the one or more client computing devices; receive mapping data that provides a mapping between (i) library-dependent source code of the at least one application and (ii) at least one third-party library from which the library-dependent source code is loaded during execution of the at least one application; determine, based on the application error data and the mapping data, a match between the library-dependent source code and at least one portion of the application error data; responsive to determining the match, attribute the at least one error that occurred during execution of the at least one application to the at least one third-party library; generate library error data associated with the at least one third-party library, wherein the library error data includes the at least one portion of the application error data; and send, to at least one third-party library development system that develops the at least one third-party library, the library error data.

In another example, a computer-readable storage device stores instructions that, when executed, cause at least one processor to perform operations. These example operations include receiving, from one or more client computing devices, application error data associated with at least one error that occurred during execution of at least one application on the one or more client computing devices, receiving mapping data that provides a mapping between (i) library-dependent source code of the at least one application and (ii) at least one third-party library from which the library-dependent source code is loaded during execution of the at least one application, and determining, based on the application error data and the mapping data, a match between the library-dependent source code and at least one portion of the application error data. The example operations further include, responsive to determining the match, attributing the at least one error that occurred during execution of the at least one application to the at least one third-party library, generating library error data associated with the at least one third-party library, wherein the library error data includes the at least one portion of the application error data, and sending, to at least one third-party library development system that develops the at least one third-party library, the library error data.

The details of one or more examples are set forth in the accompanying drawings and the description below. Other features, objects, and advantages of the disclosure will be apparent from the description and drawings, and from the claims.

DETAILED DESCRIPTION

Figure 1:
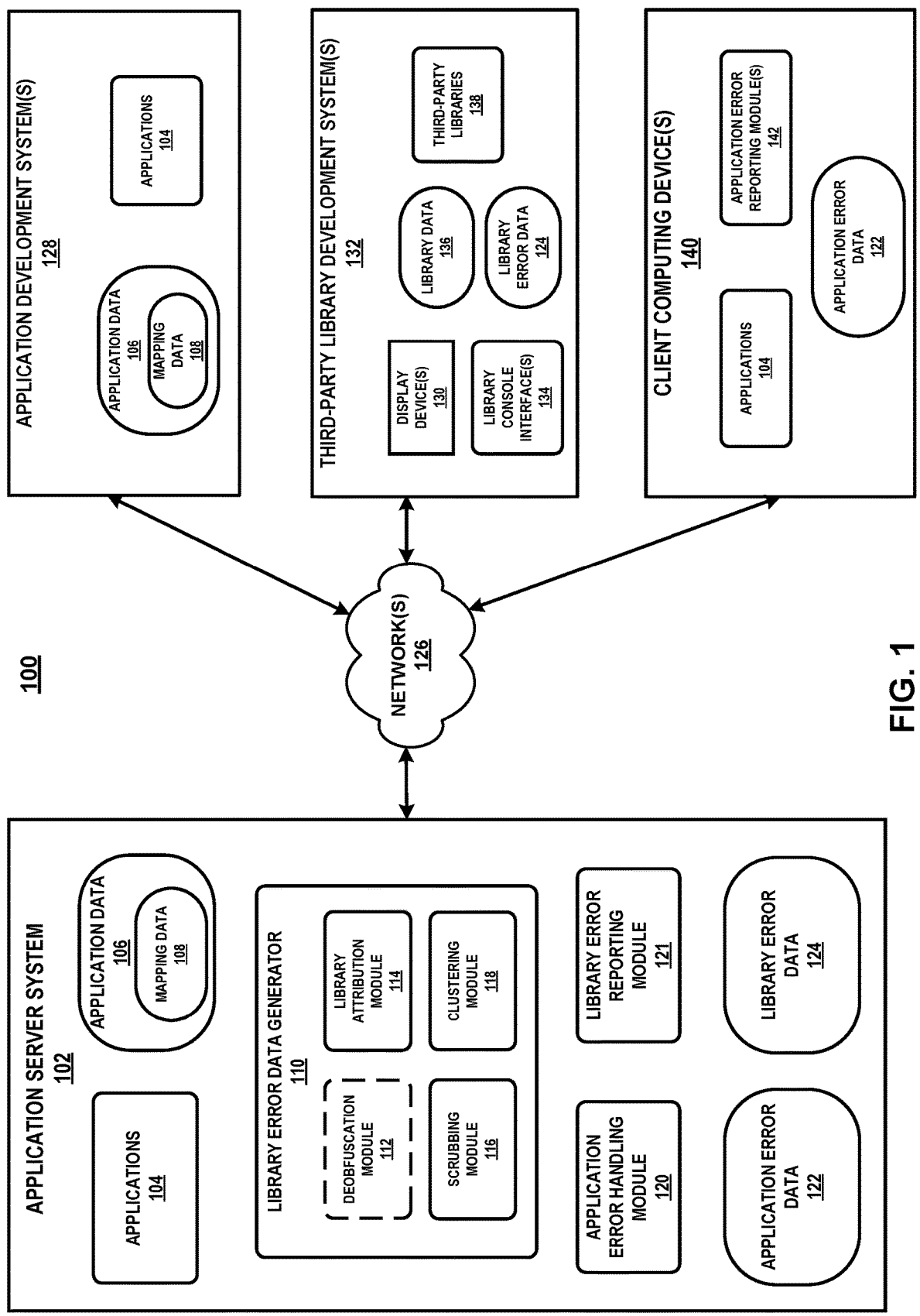
FIG. 1 is a block diagram illustrating an example distributed system including an application server system that is configured to process application error data for use by third-party library development systems, in accordance with one or more aspects of the present disclosure.

FIG. 1 is a block diagram illustrating an example distributed system 100, including an application server system 102 that is configured to process application error data for use by one or more third-party library development systems 132, in accordance with one or more aspects of the present disclosure. In the example of FIG. 1, system 100 includes application server system 102, one or more application development systems 128, one or more third-party library development systems 132, and one or more client computing devices 140. Application server system 102, application development systems 128, third-party library development systems 132, and client computing devices 140 may be communicatively coupled to one another via one or more networks 126, which may include one or more wireless and/or wired networks.

Figure 3:
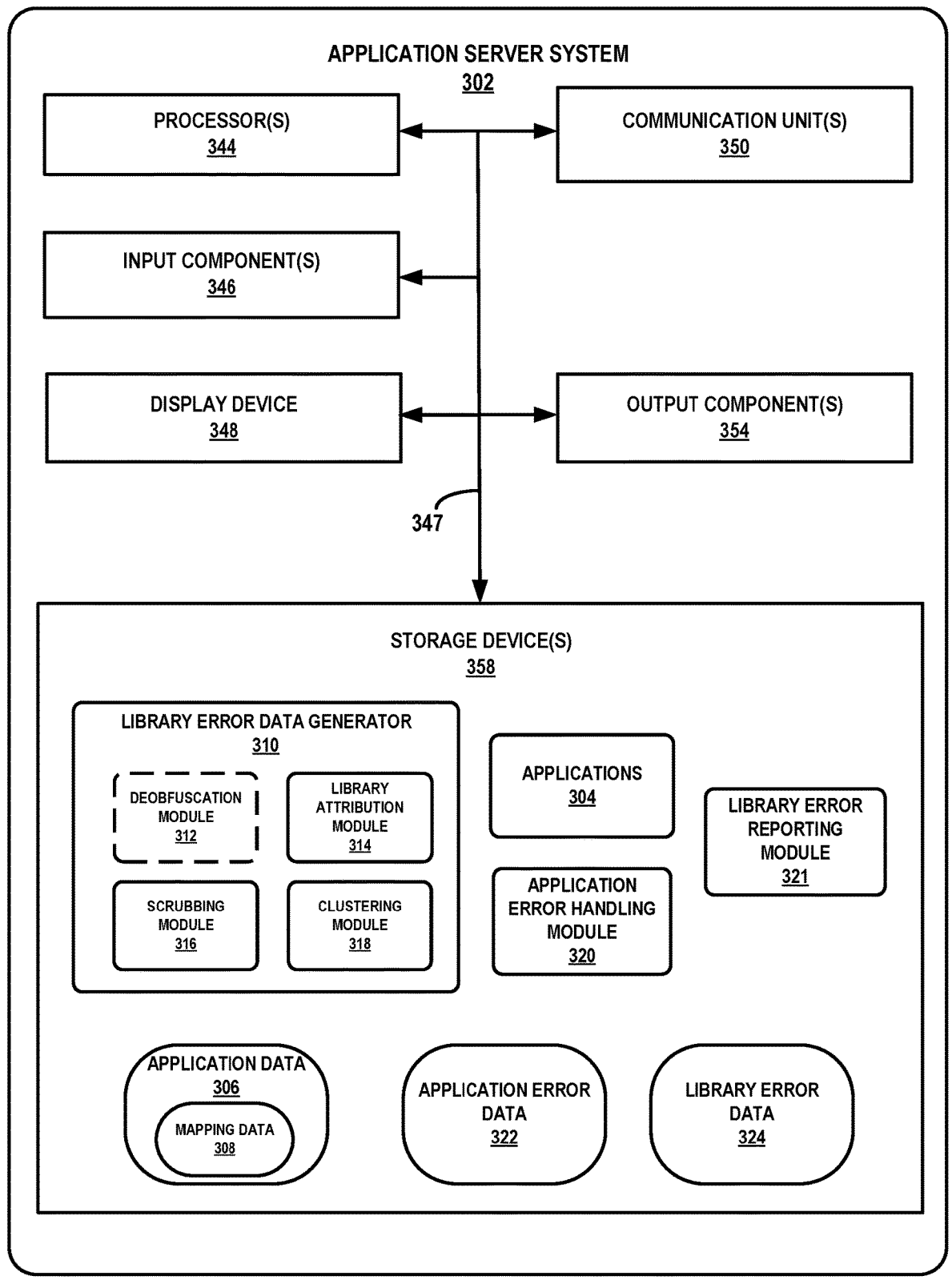
FIG. 3 is a block diagram illustrating an example application server system, in accordance with one or more aspects of the present disclosure.

Application server system 102, application development systems 128, and third-party library development systems 132 may each include one or more computing devices or servers, where each computing device or server includes one or more processors. Client computing devices 140 may also include one or more processors. Examples of client computing devices 140 include, but are not limited to, mobile phones, tablet computers, personal digital assistants (PDAs), laptop computers, portable gaming devices, portable media players, wearable computing devices (e.g., a watch, a wrist-mounted computing device, a head-mounted computing device), television platforms, or other type of computing devices. Application server system 102, application development systems 128, third-party library development systems 132, and client computing devices 140 may each include one or more communication units (such as shown in FIG. 3). These communication units may send data to and/or receive data from one or more other computing devices or systems. In some examples, the communication units support wireless and/or wired communication, and they may send and/or receive data using any variety of communication protocols.

As indicated earlier, client computing devices 140 are configured to execute any number of one or more applications 104 (e.g., mobile applications, games) over time. Various different application developers may use application development systems 128 to develop and distribute such applications 104, which may then be executed by client computing devices 140. In many cases, application development systems 128 may store local copies of applications 104 and may also distribute copies of applications 104 for storage on application server system 102, as indicated in FIG. 1. End users of client computing devices 140 may then download and execute applications 104 on client computing devices 140, where such applications 104 may be developed by any number of different application developers using application development systems 128. Applications 104 may perform various functions or access one or more services for client computing devices 140. An e-mail application, a camera application, a calendar application, a messaging application, a social media application, a travel application, a game application, a stock application, and a weather application are all examples of applications 104.

In certain situations, one or more of applications 104 may experience errors during execution on client computing devices 140, and may even crash or abort execution in certain cases based on the severity or type of errors that occur. In these situations, when an application has an error or crashes during execution on one or more of client computing devices, the runtime system(s) of client computing device 140 may generate error reports that are transmitted to one or more of application server system 102 and/or application development systems 128 that are associated with the application. In such fashion, an application developer of the application may receive and review these error reports via application development systems 128 in an effort to identify any coding faults or other issues in the application that may have caused the runtime errors on client computing devices 140.

In many cases, applications 104 include both application-dependent source code and library-dependent source code. Application-dependent source code is typically source code that has been developed (e.g., by application developers using application development system 128) specifically for applications 104. Library-dependent source code is typically library-based code that has been developed (e.g., by library developers using third-party library development systems 132) for incorporation within third-party libraries 138 that may be incorporated in, or otherwise used by, various different ones of applications 104. As a result, a large percentage of the source code for applications 104 may actually include library-dependent source code. The source code that causes applications 104 to experience errors and crashes during execution may, therefore, potentially include one or more portions of library-dependent source code that is included within applications 104.

Faults that are present in such library-dependent source code may cause any of applications 104 that include such code to experience errors or even crash. Traditionally, and as noted above, application error data 122 associated with any errors in or crashes of applications 104 is provided only to application development systems 128 on which these applications 104 have been developed. However, this application error data 122 has not traditionally been provided to third-party library development systems 132, such that library developers may have access to such application error data 122 and assess whether any of third-party libraries 138 developed by library developers may be the cause of the application errors or crashes.

Thus, according to techniques of the present disclosure, application server system 102 may be configured to process application error data 122 associated with errors occurring during execution of one or more of applications 104 on one or more of client computing devices 140, and outputting at least a portion of such data, included in library error data 124, to third-party library developers using third-party library development systems 132. In such fashion, a library developer of one or more third-party libraries 138 may receive and review such library error data 124, which may relate to the execution of library-dependent code from third-party libraries 138 that is included in applications 104 for execution. By reviewing and analyzing library error data 124, third-party library developers and/or third-party library development systems 132 may attempt to identify any coding faults or other issues in third-party libraries 138 that may have caused the runtime errors during execution of applications 104 on client computing devices 140.

As shown in FIG. 1, and as described in further detail below, application server system 102 includes various functional modules. These include library error data generator 110, application error handling module 120, and library error reporting module 121. Library error data generator 110 includes a library attribution module 114, a scrubbing module 116, a clustering module 118, and an optional deobfuscation module 112. These modules may individually or collectively perform operations described herein using any combination of software, hardware, and/or firmware residing in and/or executing at application server system 102. Application server system 102 may execute these modules using one or more processors. In some cases, application server system 102 may execute these modules as one or more virtual machines executing on underlying hardware. In some cases, one of more of these may execute as a service of an operating system or computing platform.

As will be described in further detail below, application error handling module 120 of application server system 102 may receive, from application error reporting module 142 of client computing devices 140, application error data 122 associated with at least one error that occurred during execution of one or more applications 104 on client computing devices 140. Thus, application error reporting modules 142 are configured to send such application error data 122 associated with execution of applications 104 to application error handling module 120 of application server system 102.

Figure 4:
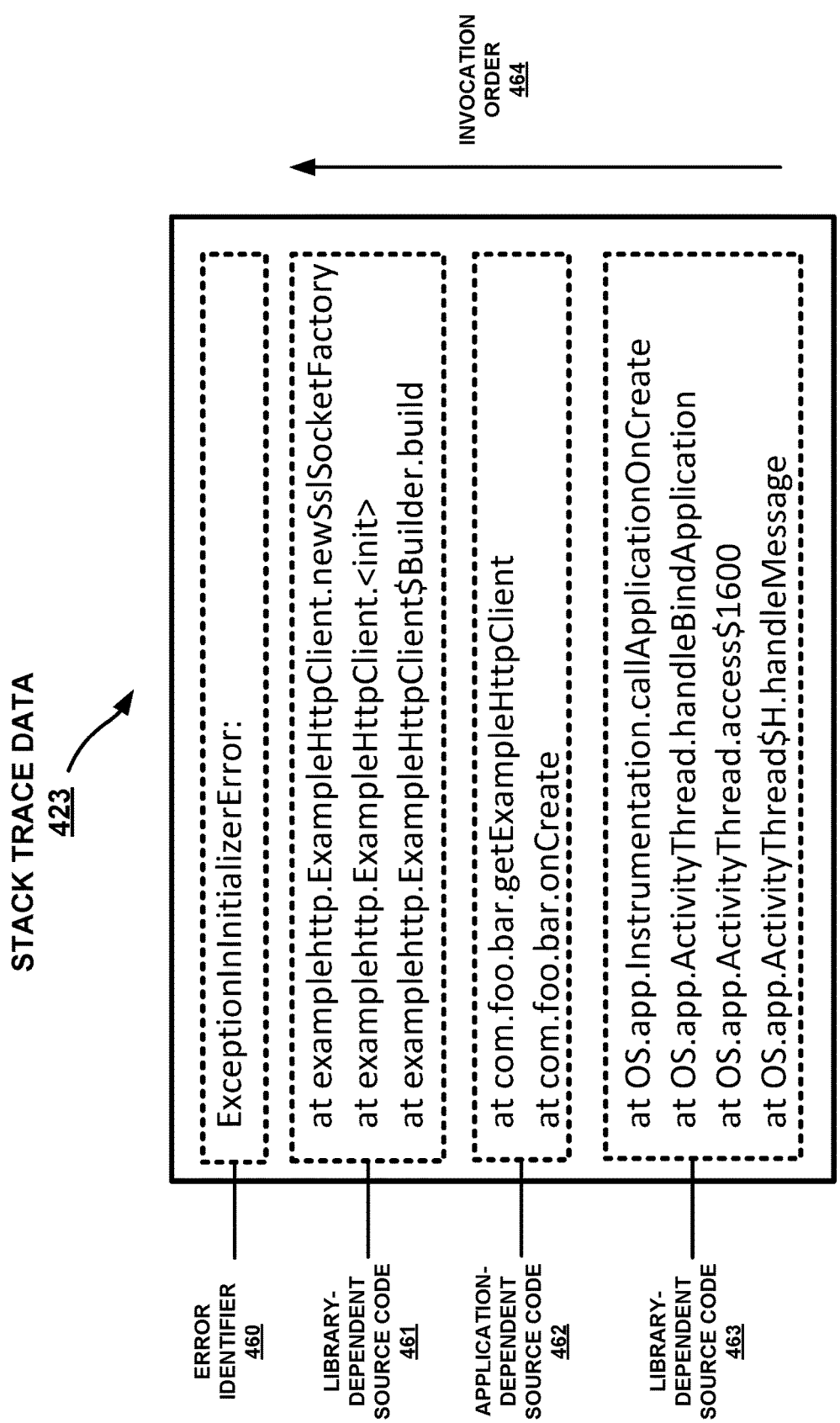
FIG. 4 is a conceptual diagram illustrating example stack trace data that includes both library-dependent source code and application-dependent source code, in accordance with one or more aspects of the present disclosure.

If one or more of applications 104 experiences a crash or other unexpected termination, application error data 122 may include application crash report data that is associated with the at least one error that caused one or more of applications 104 to crash. The application crash report data may include stack trace data that represents nested function invocations of applications 104, where at least one portion of the application crash report data includes at least one portion of the stack trace data. The nested function invocations of the stack track data are those invocations that may have led, e.g., from a program loader to a location where a crash occurred during a respective execution of one or more of applications 104. FIG. 4 illustrates one example of such stack trace data.

Application server system 102 also receives (e.g., from application development systems 128) mapping data 108 that provides a mapping between (i) library-dependent source code of applications 104 and (ii) at least one third-party library of third-party libraries 138 from which the library-dependent source code is loaded during execution of application 104. In some cases, application development systems 128 may provide application data 106 to application server system 102, where application data 106 may include metadata associated with applications 104. For instance, application data 106 may include mapping data 108. Application data 106 may also include other information associated with applications 104, such as application version number information, information associated with supported operating systems for applications 104 (e.g., version number(s) of one or more operating systems), information associated with supported device type(s) of client computing devices, deobfuscation data or files associated with code of applications 104, and the like.

Application server system 102 determines, based on application error data 122 and mapping data 108, a match between the library-dependent source code and at least one portion of application error data 122. For example, library attribution module 114 of library error data generator 110 on application server system 102 may determine this match. When application error data 122 provided by application error reporting module 142 includes stack trace data, library attribution module 114 may be configured to determine the match by matching, based on this stack trace data and mapping data 108, one or more patterns of the library-dependent source code with one or more code locations in the at least one portion of the stack trace data. As a result, library attribution module 114 may identify a mapping between code in applications 104 and any of third-party libraries 138 from which the code is loaded. This mapping provides a mechanism by which library attribution module 114 determines whether a stack trace traverses any third-party library-dependent source code, such that library attribution module 114 can attribute one or more errors (e.g., an application crash) to identified ones of third-party libraries 138.

Responsive to determining the match, library attribution module 114 may attribute the at least one error that occurred during execution of applications 104 to the at least one third-party library included in third-party libraries 138. Library attribution module 114 may then generate library error data 124 associated with the at least one third-party library, where library error data 124 includes the at least one portion of application error data 122. For example, if application error data 122 includes application crash report data, library error data 124 may include library crash report data that includes at least one portion of the application crash report data.

Figure 9:
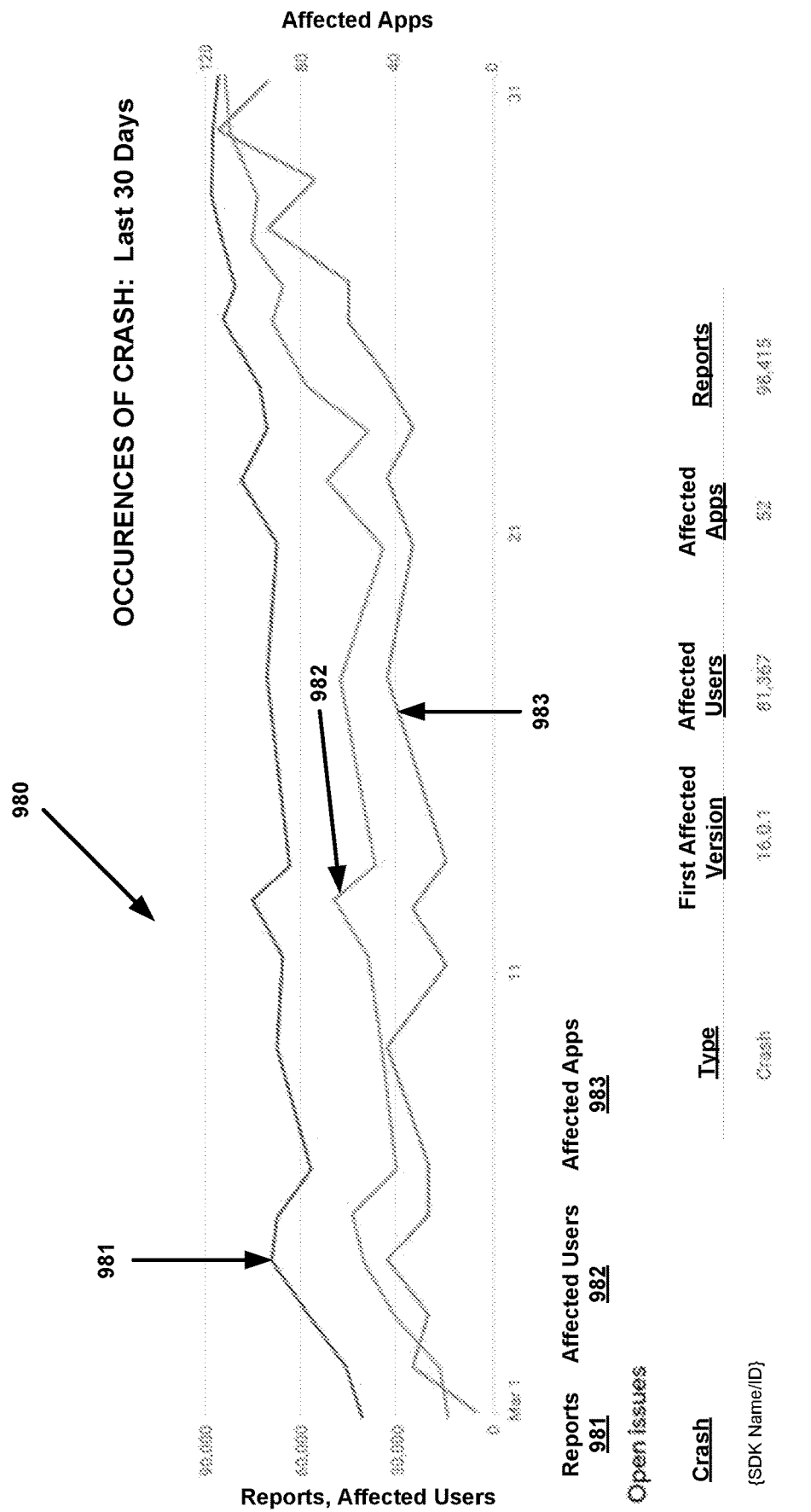
FIG. 9 is a screen diagram illustrating an example graphical user interface that may be displayed at one or more third-party library development systems based on data provided by an application server system, in accordance with one or more aspects of the present disclosure.
Figure 10:
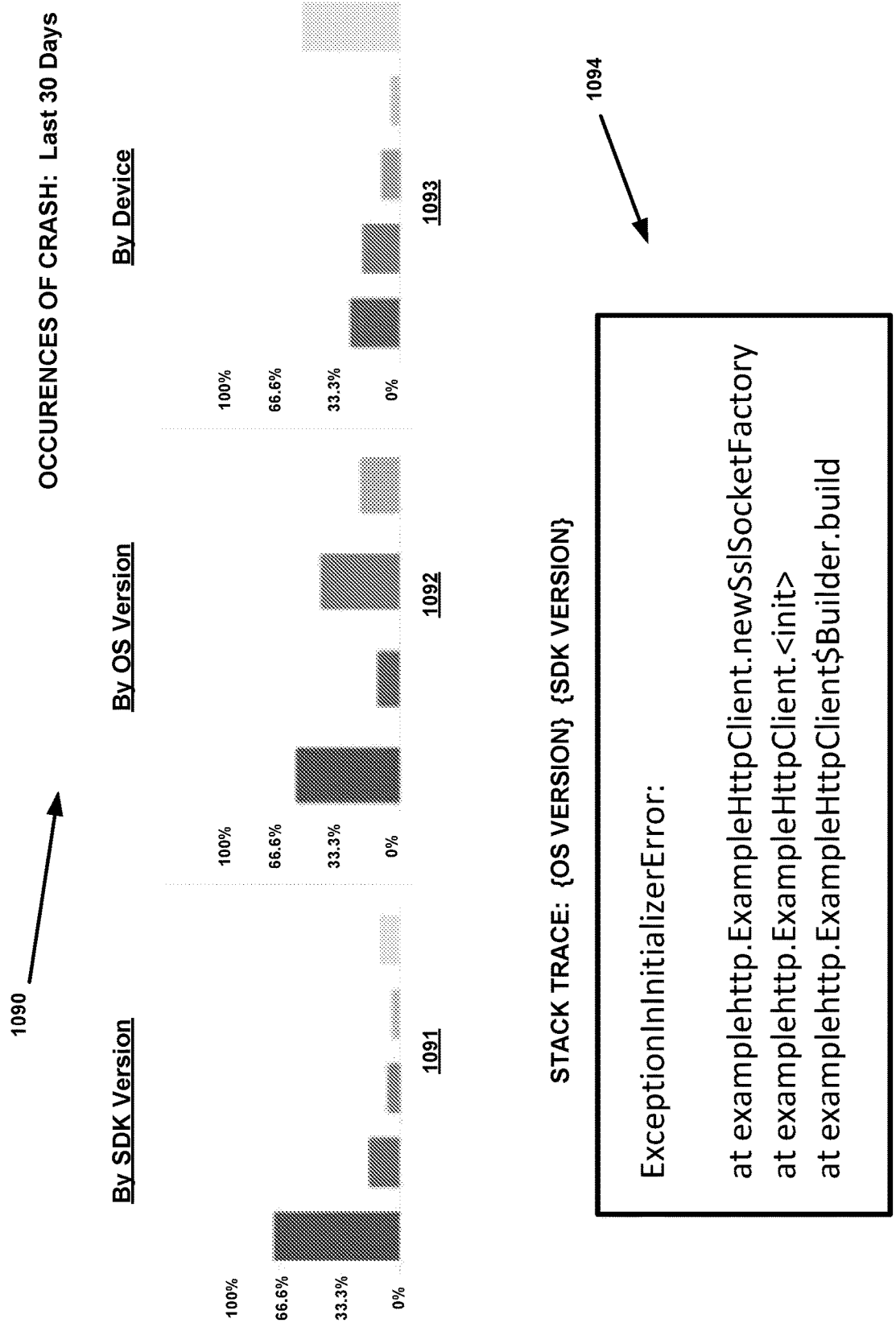
FIG. 10 is a screen diagram illustrating another example graphical user interface that may be displayed at one or more third-party library development systems based on data provided by an application server system, in accordance with one or more aspects of the present disclosure.

After library attribution module 114 generates library error data 124, library error reporting module 121 of application server system 102 then sends, via networks 126 and to one or more of third-party library development systems 132 that develop the at least one third-party library, library error data 124. The at least one third-party library is included in third-party libraries 138. For example, library error reporting module 121 may send library error data 124 to one or more library console interfaces 134 of or associated with third-party library development systems 132. Library console interfaces 134 may store library error data 124 locally on third-party library development systems 132 in some examples. Library console interfaces 134 may also output library error data 124 for display at one or more display devices 130, such as shown in the example of FIGS. 9-10. Display devices 130 may, in some examples, include one or more of a liquid crystal display (LCD), a dot matrix display, a light emitting diode (LED) display, an organic light-emitting diode (OLED) display, a micro light-emitting diode (microLED) display, an active matrix organic light-emitting diode (AMOLED) display, e-ink, or similar monochrome or color display capable of outputting visible information to third-party developers using third-party library development systems 132.

In some examples, library error reporting module 121 may include or provide an application programming interface (API) that is called by library console interfaces 134 in order to output library error data 124 for display at display devices 130. Application server system 102 may be configured to transmit library error data 124 to third-party library development systems 132 via library error reporting module 121. Third-party library development systems 132 may execute library console interfaces 134 to provide a graphical user interface (e.g., within a browser) that may output library error data 124 for display to one or more developers using display devices 130. Library console interfaces 134 may, in some cases, comprise executable code that is provided by application server system 102 to third-party library development systems 132 for execution.

In some cases, third-party library development systems 132 may also store library data 136, which may include metadata associated with third-party libraries 138. For instances, as will be described further in reference to FIG. 2, library data 136 may include deobfuscation data that is usable by an optional deobfuscation module 112 of application server system 102 to deobfuscate one or more portions of application error data 122 (e.g., stack trace data) received from client computing devices 140, and which is then used by library error data generator 110 to generate library error data 124. This deobfuscation data is associated with library-dependent source code of applications 104. In some cases, application data 106 provided by application development systems 128 to application server system 102 may also include deobfuscation data that is usable by deobfuscation module 112 to deobfuscate one or more portions of application error data 122, where such deobfuscation data is associated with application-dependent source code of applications 104.

In many cases, application error data 122 (e.g., stack trace data) provided by application error reporting module 142 may include application-specific data for applications 104, and/or sensitive internal data associated with applications 104. In addition, application error data 122 may have variability associated with execution errors of multiple different ones of applications 104, because different applications may utilize potentially faulty library-dependent source code in different contexts. Furthermore, application error data 122 may, in some cases, include indications of library-dependent source code for multiple different ones of third-party libraries. As a result, in these cases, library error data generator 110 may determine to remove one or more portions of application error data 122 when generating library error data 124 that is provided to third-party library development systems 132.

For example, a scrubbing module 116 of library error data generator 110 may be configured to remove all application-dependent information (e.g., application-dependent source code) from application error data 122 when generating library error data 124. As a result, third-party library development systems 132 do not receive any such application-dependent information within library error data 124 for use or display by library console interface 134.

Figure 7:
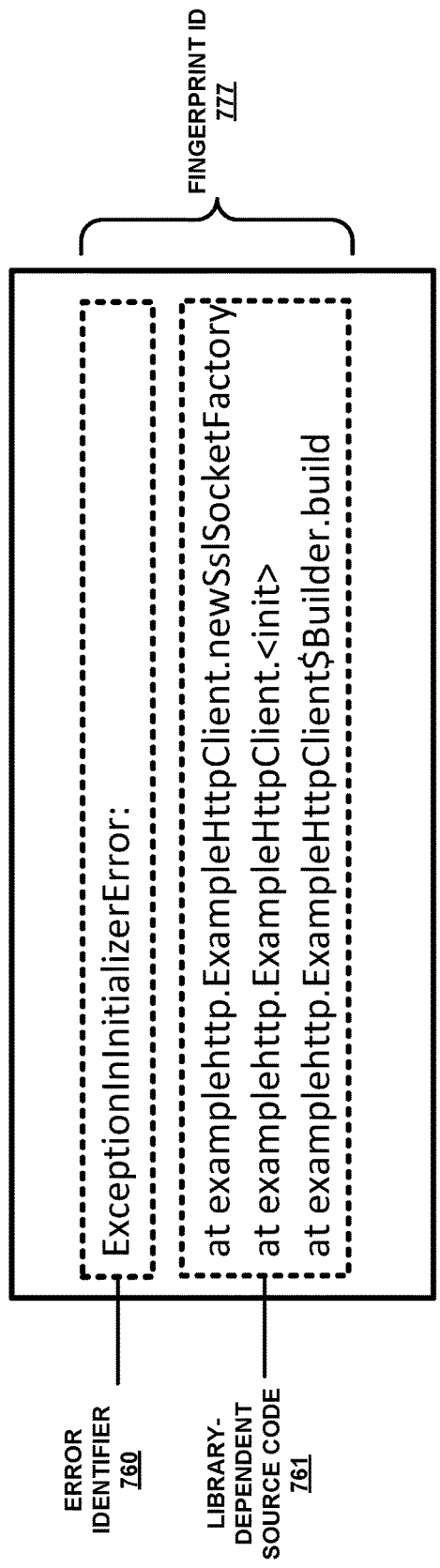
FIG. 7 is a conceptual diagram illustrating another example of stack trace data included in an SDK crash report that is provided to one or more SDK development systems, in accordance with one or more aspects of the present disclosure.
Figure 8:
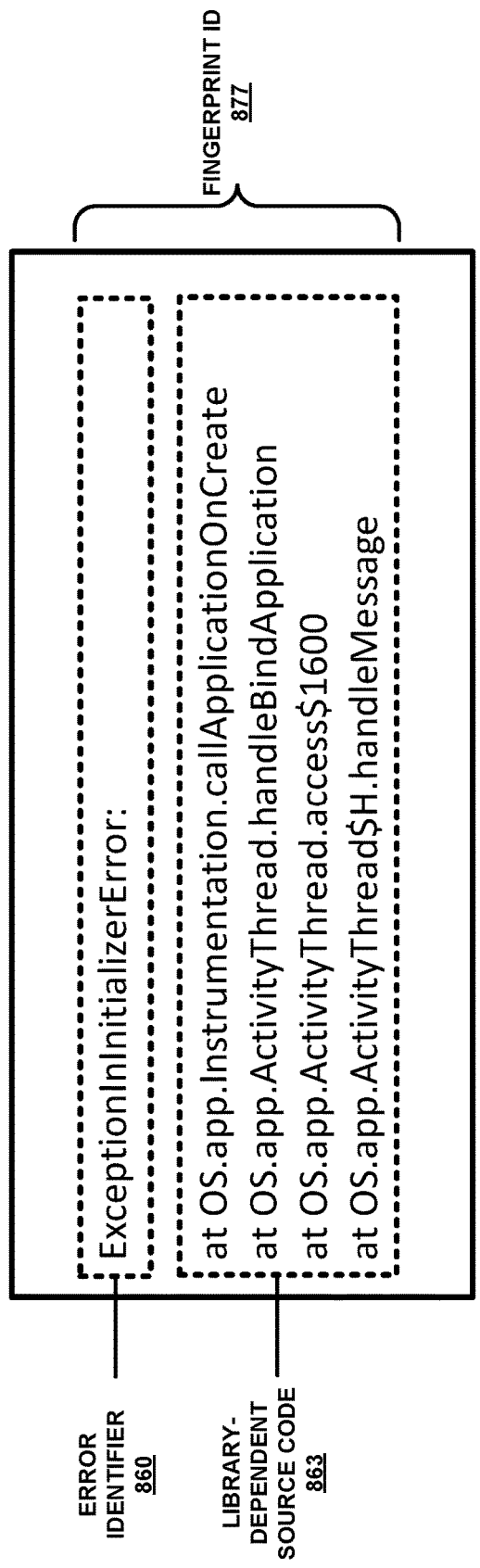
FIG. 8 is a conceptual diagram illustrating a further example of stack trace data included in an SDK crash report that is provided to one or more SDK development systems, in accordance with one or more aspects of the present disclosure.

For cases in which application error data 122 includes library-dependent source code for multiple different ones of third-party libraries 138 developed by third-party library development systems 132, scrubbing module 116 may also be configured to remove one or more portions of such library-dependent source code when generating library error data 124, such as any library-dependent source code not associated with an identified third-party library that library attribution module 114 attributes to the current error. For example, application error data 122 may have at least one portion of data that includes first library-dependent source code associated with a first third-party library of third-party libraries 138, application error data 122 and may also have at least one portion of data that includes second library-dependent source code associated with a second third-party library of third-party libraries 138. If library attribution module 114 attributes at least one error associated with application error data 122 to the first third-party library, scrubbing module 116 may remove the second library-dependent source code from application error data 122 (e.g., stack trace data) when generating library error data 124, as illustrated in FIGS. 7-8.

As shown in FIG. 1, library error data generator 110 also includes a clustering module 118. As will be described in further detail below, in various examples, clustering module 118 may be configured to cluster portions of application error data 122 (e.g., stack trace data) generated by multiple different ones of applications 104 that may be developed by application development systems 128. These applications 104 may be developed by different application developers. The clustered portions of application error data 122 may include a clustered or aggregated group of different application error reports, for example, which have similar features of characteristics. Because application error reporting modules 142 of client computing devices 140 are all configured to provide application error data 122 to application server system 102, where application error data 122 is associated with errors occurring during execution of potentially multiple different applications 104 developed by different application developers, application server system 102 may be capable of aggregating and clustering such data into library error data 124. As a result, library developers who develop third-party libraries 138 may view such aggregated and/or clustered information about libraries they develop via library console interface 134.

For example, if multiple different ones of applications 104 developed by multiple different application developers each include a potentially faulty third-party library included in third-party libraries 138 provided by third-party library development systems 132, one or more of these applications 104 may experience a similar error or crash during execution. As a result, similar application error data 122 may be generated when errors occur with such applications 104, and clustering module 118 of application server system 102 may identify similar library-dependent source code in the portions of application error data 122 that correspond to each of the errors occurring during execution of these applications 104. Library attribution module 114 may then then generate library error data 124 that includes clustered error data (e.g., stack trace data) that identifies the library-dependent source code associated with the potentially faulty third-party library. Library error reporting module 121 may send such library error data 124 to third-party library development systems 132, such that the library developer of this library may view the library error data 124 using library console interface 134. This library error data 124 may also include additional information that may be useful to the developer, such as the number of different applications experiencing errors when using this library, the type of client computing devices 140 used during application execution, the operating system(s) of client computing devices 140, the application or library version numbers, and the like.

As outlined in further detail below, scrubbing module 116 may first remove application-dependent and/or other library-dependent source code information from application error data 122, as described above, and clustering module 118 may then cluster similar application error data 122 for one or more applications into library error data 124. In some cases, in order to identify similar features or characteristics of application error data 122 generated for different applications, clustering module 118 may generate fingerprint identifiers (e.g., hash identifiers) for portions of application error data 122 generated for different applications 104 in which errors occur, wherein these portions of application error data 122 may be stored or included in library error data 124. Clustering module 118 may then cluster application error data 122 (e.g., in real-time, at one or more times during the day via batch processing of application error data 122) when generating library error data 124, based on matching fingerprint identifiers of these portions of the application error data 122. For instance, using the example outlined above, multiple different applications 104 that include a potentially faulty third-party library may each be associated with portions application error data 122 that include or identify a similar portion of library-dependent source code for this library. Clustering module 118 may generate similar or matching fingerprint identifiers for these portions of application error data 122, where the fingerprint identifier may identify or be associated with this portion of the library-dependent source code. Clustering module 118 may then include this portion of application error data 122 that includes or matches the library-dependent source code within library error data 124. Library error data 124 may also include information indicating the number of applications that include this code and that experienced an error.

For example, clustering module 118 may determine a first fingerprint identifier associated with the at least one portion of the application error data included in library error data 124. This at least one portion may include library-dependent source code. Clustering module 118 may also determine a match between the first fingerprint identifier and a second fingerprint identifier associated with previously generated library error data included in library error data 124, where the previously generated library error data is associated with the at least one third-party library. This previously generated library error data also includes at least one portion of application error data (e.g. the same or similar library-dependent source code) associated with the at least one error that occurred during execution of one or more of applications 104 on client computing devices 140. Responsive to determining the match, clustering module 118 may cluster the library error data with the previously generated library error data to generate clustered library error data within library error data 124, where the clustered library error data is associated with the at least one third-party library. In some cases, and as will be described in further detail below, the clustered library error data indicates at least a number of applications affected by the at least one error. Library error reporting module 121 may then send the clustered library error data to third-party library development systems 132.

In some cases, clustering module 118 may perform one or more application anonymization functions with respect to applications and application developers of application development systems 128. For example, when including library error information within library error data 124 that is associated with one or more of applications 104, clustering module 118 may refrain from including any specific or identifying information about the ones of applications 104 associated with library error data 124. Instead, clustering module 118 may include only generic information about such applications 104, such as the number of applications in general. In some cases, clustering module 118 may include further information, such as the type of application, one or more version numbers of the one or more third-party libraries 138, application information, at least one version number of at least one operating system executed by client computing devices 140, information about client computing devices 140 (e.g., operating system or device type information), and the like, depending on the type and detail of information included in application error data 122 that is provided to application server system 102 by client computing devices 140 (e.g., by application error reporting modules 142). In addition, and as will be described in further detail below, clustering module 118 may also include one or more of the following within library error data 124: a number of applications 104 affected by the at least one error over a period of time (e.g., 30 days, 60 days, all cumulative time to present, etc.), a number of users affected by the at least one error over the period of time, or a number of occurrences of the at least one error over the period of time.

In some cases, clustering module 118 may perform one or more application thresholding functions. For example, clustering module 118 may only include error data within library error data 124 that affects more than a threshold number of applications, to further potentially preserve the anonymity of the applications experiencing errors. In certain cases, only those errors (e.g., crashes) that are observed across more than this threshold number of applications may be reported to third-party library development systems 132. These errors may relate to a common problem or bug that will be of particular interest to the library developer of the one or more third-party libraries associated with library error data 124. Thus, in one or more examples, application server system 102 may determine that a number of applications 104 affected by the at least one error exceeds a threshold number, and library error reporting module 121 may only be configured to send clustered library error data 124 in response to determining that the number of applications affected by the at least one error exceeds the threshold number. In some cases, this threshold number may be a predetermined or default number of applications.

According to the techniques disclosed herein, the storage of certain data, such as application data 106, library data 136, application error data 122, and/or library error data 124, may only occur, in various examples, in response to a computing device or system (e.g., client computing devices 140 and/or systems 102, 128, 132) receiving an affirmative consent or response from one or more users, such as one or more application or library developers, or end users. A user may be provided with controls allowing the user to make an election as to both if and when systems, programs, or features described herein may enable collection and/storage of information, and/or if and when systems, programs, or features described herein may enable transmission of content or communications between devices. In addition, and as described above, certain data (e.g., library error data 124) may be treated in one or more ways before it is stored or used, so that identifiable information associated with applications 104 is removed.

Figure 2:
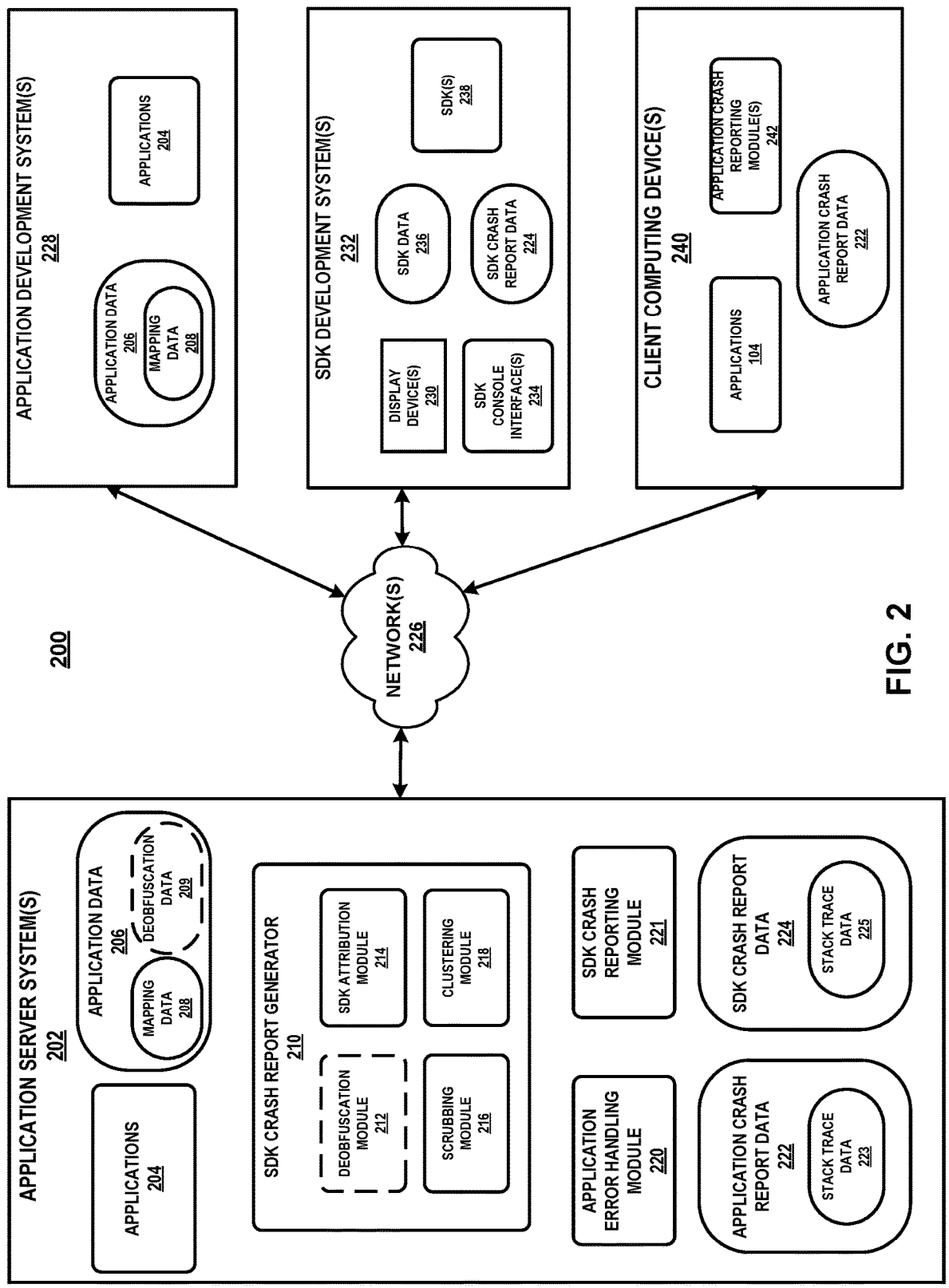
FIG. 2 is a block diagram illustrating another example distributed system including an application server system that is configured to process application crash report data for use by third-party software development kit (SDK) development systems, in accordance with one or more aspects of the present disclosure.

FIG. 2 is a block diagram illustrating another example distributed system 200 including an application server system 202 that is configured to process application crash report data 222 for use by third-party software development kit (SDK) development systems 232, in accordance with one or more aspects of the present disclosure. System 200 is one example of system 100, where various components illustrated in FIG. 2 provide functionality that is similar to similarly numbered components illustrated in FIG. 1.

For instance, system 200 includes one or more application server system 202 that are communicatively coupled, via one or more networks 226, to one or more application development systems 228, one or more SDK development systems 232, and one or more client computing devices 240. Application server system 202 is one example of application server system 102 shown in FIG. 1; networks 226 are one example of networks 126; application development systems 228 are one example of application development systems 128; SDK development systems 232 are one example of third-party library development systems 132; and client computing devices 240 are one example of client computing devices 140.

FIG. 2 illustrates an example in which the third-party libraries include SDK's 238 that are developed by third-party SDK developers using SDK development systems 232. In various examples, an SDK includes a collection of software development tools or components that are provided in an installable library. As shown in FIG. 2, SDK development systems 232 include one or more SDK's 238, which may be developed by one or more third-party SDK developers using SDK development systems 232. Various different applications, such as applications 204 developed using application development systems 228, may include one or more of SDK's 238. Similar to third-party library development systems 132 of FIG. 1, SDK development systems 232 in FIG. 2 include SDK's 238, SDK data 236, SDK crash report data 224, one or more SDK console interfaces 234, and one or more display devices 230. SDK crash report data 224 is one example of library error data 124, where one or more of the errors associated with execution of applications 204 include one or more application crashes. In some cases, SDK data 236 provided by SDK development systems 232 to application server system 202 may include deobfuscation data, as described earlier, which is associated with library-dependent source code of SDK's 238. Application server system 202 may store such data locally in deobfuscation data 209. Deobfuscation module 212 of SDK crash report generator 210 may use such deobfuscation data 209 to deobfuscate one or more portions of application crash report data 222 (e.g., library-dependent source code) in order for SDK crash report generator 210 to generate SDK crash report data 224.

Similar to application development systems 128 shown in FIG. 1, application development systems 228 of FIG. 2 include applications 204 and corresponding application data 206, which includes mapping data 208. One or more application developers may use application development systems 228 to create applications 204. In some cases, application data 206 provided by application development systems 228 to application server system 202 may also include deobfuscation data, which is associated with application-dependent source code of applications 204. Application server system 202 may store such data locally in deobfuscation data 209.

Similar to client computing devices 140 shown in FIG. 1, client computing devices 240 of FIG. 2 include applications 204. One or more of applications 204 may crash or otherwise terminate execution, and application crash report data 222 may include data associated with these crashes. Application crash report data 222 is one example of application error data 122 shown in FIG. 1. One or more application crash reporting modules 242 are configured to send application crash report data 222 to application server system 202.

Application server system 202 includes applications 204 and corresponding application data 206. Application data 206 includes mapping data 208 and optional deobfuscation data 209. Application server system 202 also include SDK crash report generator 210, application error handling module 220, SDK crash reporting module 221, application crash report data 222, and SDK crash report data 224 (which are examples of library error data generator 110, application error handling module 120, library error reporting module 121, application error data 122, and library error data 124, respectively).

Similar to library error data generator 110, SDK crash report generator 210 includes an SDK attribution module 214, a scrubbing module 216, a clustering module 218, and an optional deobfuscation module 212. SDK crash report generator 210 is configured to generate SDK crash report data 224 based on application crash report data 222 that is sent by application crash reporting modules 242 and processed by application error handling module 220 of application server system 202. Application crash report data 222 may include stack trace data 223 that is provided by application crash reporting modules 242, and SDK crash report data 224 generated by SDK crash report generator 210 may also include stack trace data 225. Stack trace data 225 may include one or more portions of stack trace data 223, as described earlier in reference to library error data 124 and application error data 122 of FIG. 1. SDK crash reporting module 221 of application server system 202 may send SDK crash report data 224 to SDK development systems 232, which may then display one or more portions of this display at display devices 230.

FIG. 3 is a block diagram illustrating an example application server system 302, in accordance with one or more aspects of the present disclosure. Application server system 302 may be one example of application server system 102 (FIG. 1) and/or application server system 202 (FIG. 2). FIG. 3 illustrates only one particular example of application server system 302, and many other examples of application server system 302 may be used in other instances. In various cases, application server system 302 may include a subset of the components shown in FIG. 3 or may include additional components not shown in FIG. 3.

In the example of FIG. 3, application server system 302 includes display device 348, one or more processors 344, one or more input components 346, one or more communication units 350, one or more output components 354, and one or more storage devices 358. Communication channels 347 may interconnect each of the components 344, 346, 348, 350, 354, and/or 358 for inter-component communications (physically, communicatively, and/or operatively). In some examples, communication channels 347 may include a system bus, a network connection, an inter-process communication data structure, or any other method for communicating data between hardware and/or software.

One or more input components 346 of application server system 302 may receive input, such as input from a user. Examples of input are touch/tactile, presence-sensitive, and audio input. Examples of input components 346 include a presence-sensitive screen, touch-sensitive screen, touchscreen, mouse, keyboard, trackpad, voice responsive system, video camera, microphone or any other type of device for detecting input from a human or machine.

One or more output components 354 of application server system 302 may generate output. Examples of output are haptic, audio, and visual output. Examples of output components 354 include a presence-sensitive screen, a touch-sensitive screen, a touchscreen, a sound card, a video graphics adapter card, a speaker, a liquid crystal display (LCD), an organic light-emitting diode (OLED) display, a micro light-emitting diode (microLED) display, an active matrix organic light-emitting diode (AMOLED) display, a haptic device, or any other type of device for generating output to a human or machine.

One or more communication units 350 of application server system 302 may communicate with external devices via one or more networks by transmitting and/or receiving network signals on the one or more networks (e.g., one or more wired and/or wireless networks). For example, application server system 302 may use communication units 350 to transmit and/or receive radio signals on a radio network such as a cellular radio network. Likewise, communication units 350 may transmit and/or receive satellite signals on a satellite network such as a global positioning system (GPS) network. Examples of communication units 350 include a network interface card (e.g. such as an Ethernet card), an optical transceiver, a radio frequency transceiver, a GPS receiver, or any other type of device that can send and/or receive information. Other examples of communication units 350 may include short wave radios, cellular data radios, wireless Ethernet network radios, as well as universal serial bus (USB) controllers.

In some cases, application server system 302 may include a display device 348. In some examples, display device 348 may provide output to a user using haptic, audio, or visual stimuli as described above with reference to output components 354. For example, display device 348 may provide display or video output as described with reference to output components 354. Display device 348 may also provide input capabilities such as that described above with reference to input components 346. In some cases, application server system 302 may not include display device 348.

One or more storage devices 358 may store information for processing during operation of application server system 302. In some examples, storage devices 358 include temporary memory, meaning that a primary purpose of storage devices 358 is not long-term storage. Storage devices 358 on application server system 302 may be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art.

Storage devices 358, in some examples, include one or more computer-readable storage media. Storage devices 358 may be configured to store larger amounts of information than volatile memory. Storage devices 358 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 358 may store program instructions and/or data associated with one or more of applications 304, application data 306, mapping data 308, library error data generator 310, application error handling module 320, library error reporting module 321, application error data 322, and library error data 324, which may include examples of similarly numbered components or modules shown in FIGS. 1-2. Library error data generator 310 includes deobfuscation module 312, library attribution module 314, scrubbing module 316, and clustering module 318.

One or more processors 344 may implement functionality and/or execute instructions within application server system 302. For example, processors 344 on application server system 302 may receive and execute instructions stored by storage devices 358 that execute the functionality of applications 304, library error data generator 310 (including deobfuscation module 312, library attribution module 314, scrubbing module 316, and clustering module 318), application error handling module 320, and/or library error reporting module 321. These instructions executed by processors 344 may cause application server system 302 to store information within storage devices 358 during program execution.

FIG. 4 is a conceptual diagram illustrating example stack trace data 423 that includes both library-dependent source code and application-dependent source code, in accordance with one or more aspects of the present disclosure. Stack trace data 423 is one example of stack trace data 223 shown in FIG. 2, which may be included in application crash report data 222 that is provided by to application server system 202 by client computing devices 240. Stack trace data 423 is associated with at least one error that occurred during execution of, e.g., one of applications 204 shown in FIG. 2. For purposes of illustration only, the related examples illustrated in FIGS. 4-8 will be described in reference to system 200 shown in FIG. 2.

As illustrated in FIG. 4, stack trace data 423 includes an error identifier (e.g., exception identifier) 460 that identifies one or more errors associated with stack trace data 423. Stack trace data 423 also includes multiple code portions: library-dependent source code 461, application-dependent source code 462, and library-dependent source code 463. Stack trace data 423 may represents nested function invocations having an invocation order 464, which may have led, e.g., from a program loader to a location where a crash occurred during a respective execution of one or more of applications (e.g., applications 204 shown in FIG. 2). Invocation order 464 of function invocations that may have led to the possible crash is from bottom-to-top in the example of FIG. 4 (e.g., an order of library-dependent source code 463, application-dependent source code 462, and library-dependent source code 461).

In various examples, each line of stack trace data 423 shown in FIG. 4 may be referred to as a frame or code location of the stack trace. In some cases, each frame or code location of the stack trace may indicate information associated with the source code (e.g., library-dependent or application-dependent source code) for that frame of the stack trace. For example, this information may include a library name or identifier. In some examples, the name or identifier may include a package name, a namespace name, a module name, or the like. In some examples, the information for each frame or code location may include additional information, such as one or more of a class name, a method name, and/or a function name, separately or in any combination. In some cases, each frame or code location of the stack trace may further indicate a file name of the file in which the source code is included, and/or the line number of the source code for that frame.

Application-dependent source code 462 is associated with code that is specific to, e.g., an application of applications 204. Library-dependent source code 461 is associated with code from, e.g., a first SDK (named "examplehttp") of SDK's 238 shown in FIG. 2. Library-dependent source code 463 is associated with code from, e.g., a second SDK named ("OS.app") of SDK's 238, where "OS" may represent a name of an operating system in this particular example.

Figure 5:
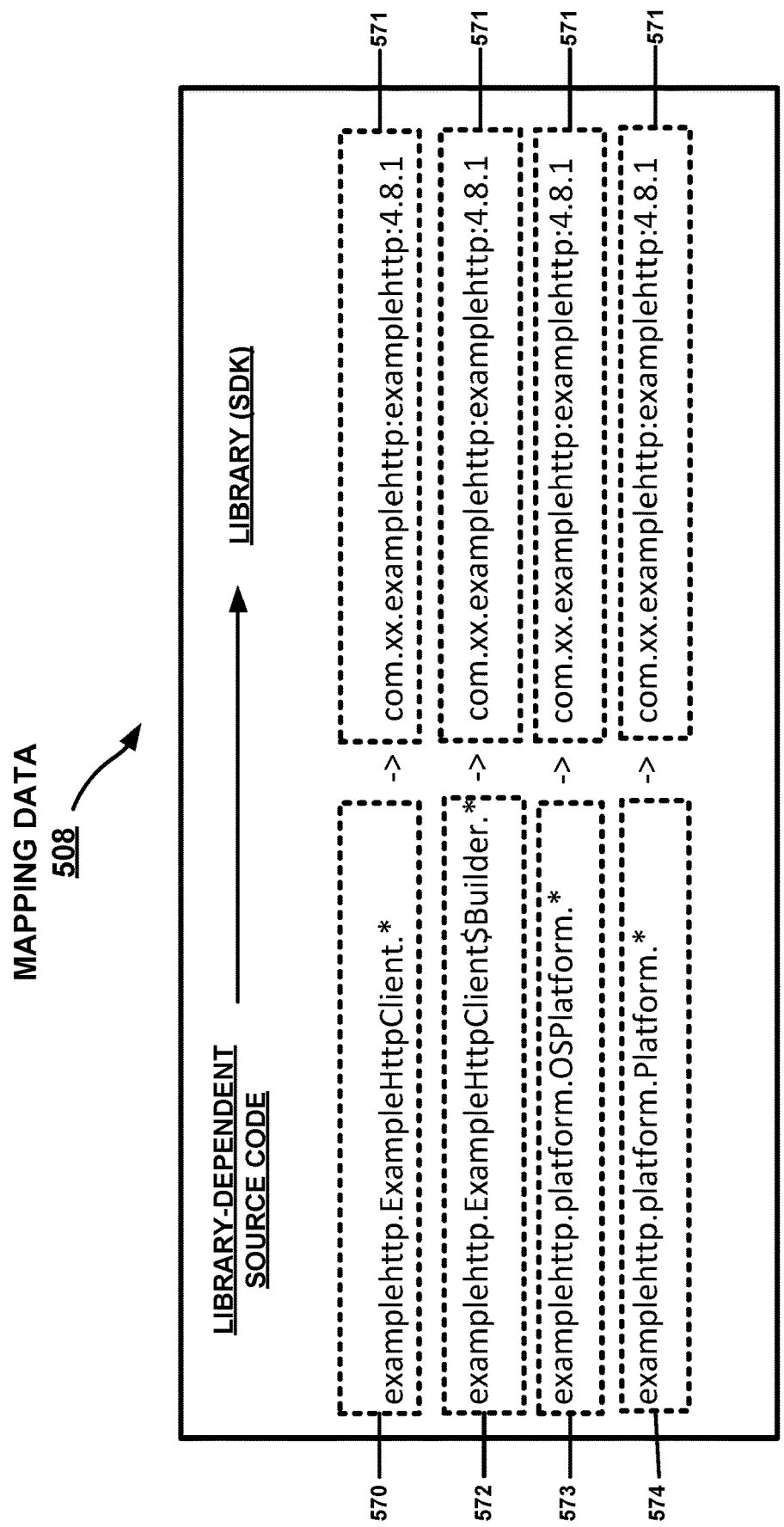
FIG. 5 is a conceptual diagram illustrating example mapping data that provides a mapping between one or more portions of library-dependent source code of an application and at least one third-party library from which the library-dependent source code is loaded during execution of the application, in accordance with one or more aspects of the present disclosure.

FIG. 5 is a conceptual diagram illustrating example mapping data 508 that provides a mapping between one or more portions of library-dependent source code of an application and at least one third-party library from which the library-dependent source code is loaded during execution of the application, in accordance with one or more aspects of the present disclosure. Mapping data 508 may be one example of mapping data 208 shown in FIG. 2 that is included in application data 206 provided by application development systems 228 to application server system 202. The use of such mapping data may, in various cases, enable SDK crash report generator 210 to determine whether stack trace data, such as stack trace data 423, traverses any library code of an application in applications 204, such that SDK attribution module 214 may attribute a crash to the library corresponding to such code.

In some cases, application developers and/or application development systems 228 may develop or create mapping data 508, which is associated with respective ones of developed applications 204 that are deployed onto application server system 202 shown in FIG. 2. Application development systems 228 may provide such mapping data 508 (which is one example of mapping data 208 shown in FIG. 2) to application server system 202, for use by SDK crash report generator 210. In some cases, application server system 202 may obtain one or more portions of mapping data 508 from one or more external sources or repositories (e.g., publicly accessible repositories providing such information about applications 204).

As illustrated in FIG. 5, mapping data 508 that provides a mapping between one or more portions of library-dependent source code of an application of applications 204 and at least one third-party library (e.g., SDK) from which the library-dependent source code is loaded during execution of the application. In FIG. 5, example mappings are shown between identified portions or patterns of library-dependent source code and a first SDK ("examplehttp").

For example, mapping data 508 maps a first portion or pattern 570 of library-dependent source code of the application to an SDK identifier 571 of this first SDK. As shown in FIG. 5, pattern 570 identifies library-dependent source code having a package name "okttp3" and a class name of "ExampleHttpClient." The "*" wildcard character in pattern 570 indicates any functions/methods in library-dependent source code with this package and class name are mapped to SDK identifier 571. Mapping data 508 maps pattern 570 of library-dependent source code to the first SDK having SDK identifier 571. SDK identifier 571 identifies this first SDK ("examplehttp"), where SDK identifier 571 may identify an SDK name and also version number ("4.8.1").

Mapping data 508 also maps a second portion or pattern 572 of library-dependent source code to SDK identifier 571 of the first SDK. Pattern 572 identifies library-dependent source code having a package name "examplehttp" and a class name of "ExampleHttpClient$Builder." The "*" wildcard character in pattern 572 indicates any functions/methods in library-dependent source code with this package and class name are mapped to SDK identifier 571.

Mapping data 508 also maps a third portion or pattern 573 of library-dependent source code to SDK identifier 571 of the first SDK. Pattern 573 identifies library-dependent source code having a package name "examplehttp" and being associated with platform code having a class name of "OSPlatform." The "*" wildcard character in pattern 573 indicates any functions/methods in library-dependent source code with this package and class name are mapped to SDK identifier 571.

Mapping data 508 also maps a fourth portion or pattern 574 of library-dependent source code to SDK identifier 571 of the first SDK. Pattern 574 identifies library-dependent source code having a package name "examplehttp" and being associated with platform code having a class name of "Platform." The "*" wildcard character in pattern 574 indicates any functions/methods in library-dependent source code with this package and class name are mapped to SDK identifier 571. Thus, in the example of FIG. 5, all of the portions or patterns 570, 571, 572, 573 of library-dependent source code are mapped to the same, first SDK ("examplehttp").

Figure 6:
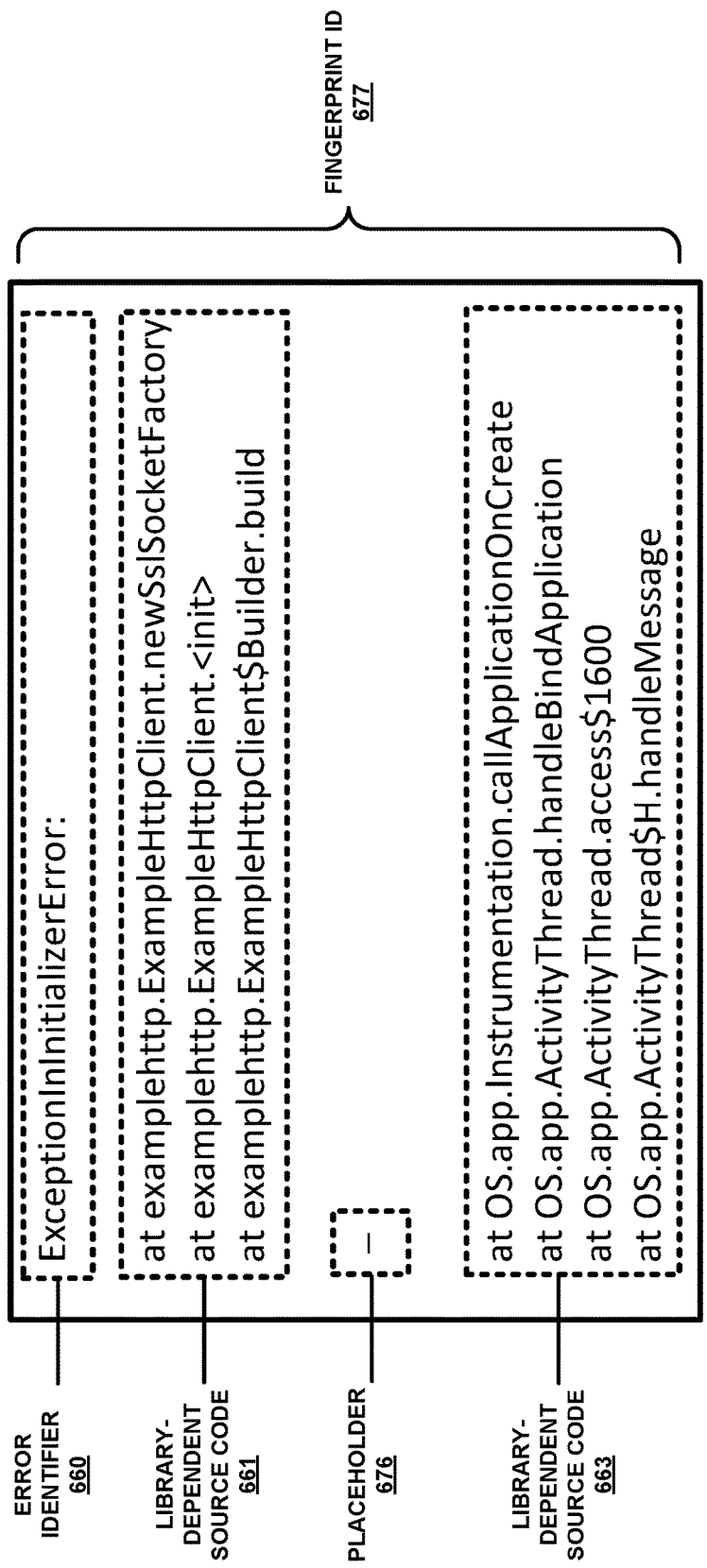
FIG. 6 is a conceptual diagram illustrating example stack trace data included in an SDK crash report that is provided to one or more SDK development systems, in accordance with one or more aspects of the present disclosure.

FIG. 6 is a conceptual diagram illustrating example stack trace data 625 included in an SDK crash report that is provided to one or more SDK development systems 232, in accordance with one or more aspects of the present disclosure. In various examples, SDK crash report generator 210 (e.g., using SDK attribution module 214) may generate SDK crash report data 224, which includes stack trace data 625 shown in FIG. 6. SDK crash reporting module 221 may then send this SDK crash report data 224 to SDK development systems 232 for output to display devices 230.

In various examples, and as described earlier, SDK attribution module 214 may attribute a crash to one or more SDK's included in SDK's 238. These SDK's may include library-dependent source code that is the cause of this crash. SDK attribution module 214 may determine, based on stack trace data 423 (FIG. 4) and mapping data (including mapping data 508 shown in FIG. 5) a match between library-dependent source code of the application and at least one portion of stack trace data 423. For example, based on mapping data 508 and stack trace data 423, SDK attribution module 214 may identify a first SDK ("examplehttp") as a possible cause of the crash. In addition, based on stack trace data 423 and additional mapping data related to a second SDK ("OS.app"), which is not shown in FIG. 5, SDK attribution module 214 may identify the second SDK as another possible cause of the crash. Thus, SDK attribution module 214 identifies these first and second SDK's as SDK candidates 678 that may have caused the crash. In some examples, one or more of such SDK candidates may be responsible for any given crash. Because the first SDK is located at the top of stack trace data 423 shown in FIG. 4, SDK attribution module 214 may, in some cases, rank the first SDK as a first or potentially stronger candidate responsible for the crash in relation to the second SDK.

In order to identify these SDK candidates 678, in various examples, SDK attribution module 214 may analyze the mapping data and attempt to match portions or patterns in such data (e.g., patterns 570, 572, 573, 574 in mapping data 508) with source code included in the frames or code locations of stack trace data 423 received from client computing devices 240. Upon find one or more matches, SDK attribution module 214 may then identify the third-party libraries corresponding to the library identifiers in the mapping data (e.g., first SDK "examplehttp" associated with SDK identifier 571 in mapping data 508) as libraries that may be potential causes of the crash.

In one or more particular non-limiting examples, SDK attribution module 214 may perform such a process to identify SDK candidates 678 based on the following pseudocode:

```
set<library> matched_libraries = { };
for (string code_location in input_stack_trace.code_locations) {
    for (string library_pattern in mapping.library_patterns) {
        if (library_pattern.matches(code_location)) {
            matched_libraries.add(library_pattern.library);
        }
    }
}
```

In this pseudocode, the input_stack_trace may correspond to stack trace data 423, where input_stack_trace.code_locations correspond to each frame or code location of stack trace data 423. The mapping.library_patterns of the pseudocode may correspond to patterns 570, 572, 573, 575 of mapping data 508. As noted above, SDK attribution module 214 may analyze the mapping data and attempt to match portions or patterns in such data (e.g., patterns 570, 572, 573, 574 in mapping data 508) with source code included in the frames or code locations of stack trace data 423 received from client computing devices 240. Upon finding such matches, SDK attribution module 214 may add each identified library (e.g., library identifier) to the set of matched_libraries (e.g., SDK candidates 678).

After performing the match operations, SDK crash report generator 210 may generate stack trace data 625 shown in FIG. 6, which is associated with the first SDK ("examplehttp") and second SDK ("OS.app"), and which is included in SDK crash report data 224. Stack trace data 625 may include one or more portions of stack trace data 423. SDK crash reporting module 221 may send this SDK crash reporting data 224, including stack trace data 625, to SDK development systems 232.

For example, as shown in FIG. 6, stack trace data 625 includes an error identifier 660, library-dependent source code 661 associated with the first SDK ("examplehttp") of SDK's 238, and library-dependent source code 663 associated with the second SDK ("OS.app"). Error identifier 660 corresponds to error identifier 460 of stack trace data 423 in FIG. 4, library-dependent source code 661 corresponds to library-dependent source code 461, and library-dependent source code 663 corresponds to library-dependent source code 463.

However, as shown in FIG. 6, stack trace data 625 does not include application-dependent source code 462. Instead, stack trace data 625 includes a generic or uniform placeholder 676. FIG. 6 illustrates one or more "-" or "_" characters as placeholder 676, although in other examples, any other form of symbol or alphanumeric characters (e.g., "<private>") may be used. As described earlier, in various cases, scrubbing module 216 may be configured to remove certain information from stack trace data 423 when generating library error data, such as stack trace data 625 shown in FIG. 6.

For example, after identifying SDK candidates 678, scrubbing module 216 may wipe sensitive or specific information associated with the identity or internal details of the application that crashed. Thus, in various cases, scrubbing module 216 may be configured to remove all application-dependent information (e.g., application-dependent source code 462) from stack trace data 423 when generating stack trace data 625, and replacing this information with placeholder 676. As a result, SDK development systems 232 do not receive any such application-dependent information within SDK crash report data 224 for use or display by SDK console interfaces 234.

SDK crash report generator 210 (e.g., using SDK attribution module 214 and/or clustering module 218) may, in some cases, be configured to generate a unique fingerprint identifier (ID) 677, such as a unique hash identifier, which is associated with the content of stack trace data 625. Fingerprint ID 677 may be used for aggregating and/or clustering stack trace data 625 with other similar stack trace data that may be associated with other application crashes, as described in further detail below. SDK crash reporting module 221 may send this SDK crash reporting data 224, including stack trace data 625, to SDK development systems 232 that are associated with the first SDK ("examplehttp") and the second SDK ("OS.app") included in SDK's 238. The SDK developers of these first and/or second SDK's may then review SDK crash reporting data 224 using SDK console interfaces 234.

In other cases, however, scrubbing module 216 may further be configured to remove information from stack trace data 625 that is associated with other SDK's. Thus, in the example of FIG. 6 in which SDK attribution module 214 has identified first and second SDK's as SDK candidates 678, scrubbing module 216 may generate two separate instances of stack trace data that are associated with the first and second SDK's. The first stack trace data may include only library-dependent source code associated with the first SDK, and the second stack trace data may include only library-dependent source code associated with the second SDK. Both the first and second stack trace data may be stored in SDK crash report data 224. SDK crash reporting module 221 may send the portion of SDK crash report data 224 that includes the first stack trace data to the one or more of SDK development systems 232 that develop the first SDK of SDK's 238, and SDK crash reporting module 221 may send the portion of SDK crash report data 224 that includes the second stack trace data to the one or more of SDK development systems 232 that develop with the second SDK. The respective SDK developers of these first and second SDK's may then review the respective first and second stack trace data associated with the application crash. FIGS. 7-8 provide examples of such first and second stack trace data. By utilizing this approach, scrubbing module 216 is configured to remove SDK information about the second SDK when providing first stack trace data to the developer of the first SDK, and to remove SDK information about the first SDK when providing second stack trace data to the developer of the second SDK.

FIG. 7 is a conceptual diagram illustrating another example of stack trace data 725 included in an SDK crash report (e.g., SDK crash report data 224) provided to one or more SDK development systems 232, in accordance with one or more aspects of the present disclosure. In cases where stack trace data 423 of FIG. 4 includes library-dependent source code for multiple different ones of third-party libraries 238 developed by third-party library development systems 232 (FIG. 2), scrubbing module 216 may be configured to remove one or more portions of such library-dependent source code when generating stack trace data 725, such as any library-dependent source code not associated with an identified third-party library that library attribution module 214 attributes to the current error.

Thus, in the example of FIG. 7, scrubbing module 216 removes all frames of stack track data 423 provided by client computing devices 240 that include application-dependent source code 462 and any library-dependent source code that is not associated with the first identified SDK (library) candidate "examplehttp." Thus, scrubbing module 216 removes library-dependent source code 463 that is associated with the second identified SDK (library) candidate "OS.app" when generating or updating stack trace data 725. As shown in FIG. 7, stack trace data 725 includes error identifier 760 and library-dependent source code 761 associated with the first SDK candidate "examplehttp." Clustering module 218 may also generate a unique fingerprint identifier 777 for stack trace data 725, which may be used for clustering stack trace data 725 with other similar stack trace data associated with other application crashes, as described in more detail below.

FIG. 8 is a conceptual diagram illustrating another example of stack trace data 825 included in an SDK crash report (e.g., SDK crash report data 224) provided to one or more SDK development systems 232, in accordance with one or more aspects of the present disclosure. In cases where stack trace data 423 of FIG. 4 includes library-dependent source code for multiple different ones of third-party libraries 238 developed by third-party library development systems 232 (FIG. 2), scrubbing module 216 may again be configured to remove one or more portions of such library-dependent source code when generating stack trace data 825, such as any library-dependent source code not associated with an identified third-party library that library attribution module 214 attributes to the current error.

Thus, in the example of FIG. 8, scrubbing module 216 removes all frames of stack track data 423 provided by client computing devices 240 that include application-dependent source code 462 and any library-dependent source code that is not associated with the second identified SDK (library) candidate "OS.app" Thus, scrubbing module 216 removes library-dependent source code 463 that is associated with the first identified SDK (library) candidate "examplehttp" when generating or updating stack trace data 825. As shown in FIG. 8, stack trace data 825 includes error identifier 860 and library-dependent source code 863 associated with the second SDK candidate "OS.app." Clustering module 218 may also generate a unique fingerprint identifier 877 for stack trace data 825, which may be used for clustering stack trace data 825 with other similar stack trace data associated with other application crashes.

As a result, scrubbing module 216 may generate two separate instances of stack trace data that are associated with these first and second SDK's. The first stack trace data may include only library-dependent source code associated with the first SDK, and the second stack trace data may include only library-dependent source code associated with the second SDK. In one or more particular non-limiting examples, scrubbing module 216 may perform a process to generate such stack trace data for different candidate SDK's, for inclusion in SDK crash report data 224 that is sent to SDK development systems 232, similar to or based on the following pseudocode:

```
list<stack_trace> library_stack_traces = [ ];
for (library in matched_libraries) {
    library_stack_trace = library_stack_traces.add_new( );
    last_matched = false;
    for (code_location in input_stack_trace.code_locations) {
        if (library.matches(code_location) {
            last_matched = true;
            library_stack_trace.append(code_location)
        } else if (last_matched) {
            last_matched = false;
            library_stack_trace.append ('_')
        }
    }
}
```

In this pseudocode, matched_libraries are those SDK candidates 678, namely the first SDK ("examplehttp") and the second SDK ("OS.app). This pseudocode creates separate first and second instances of stack track data for the first and second SDK's within the list of library_stack_traces. For example, scrubbing module 216 creates and adds first library stack trace data 725 (library_stack_trace) to the list of library_stack_traces, which includes library-dependent source code 761 for the first SDK within stack trace data 725, which is generated from input stack trace data 423 (input_stack_trace). Scrubbing module 216 traverses each frame or code_location of stack trace data 423 to identify library-dependent source code 461 for the first SDK. Upon identifying such code, scrubbing module 216 adds or appends this code as library-dependent source code 761 into the first library stack trace data 725 (library_stack_trace) in the list. For any other library-dependent source code (e.g., library-dependent source code 463) or any application-dependent source code (e.g., application-dependent source code 462), scrubbing module 216 removes this code entirely in stack trace data 725, as shown in FIG. 7, or replaces such code with one or more uniform placeholders (e.g., "_" characters) (not shown in FIG. 7).

Similarly, scrubbing module 216 creates and adds second library stack trace data 825 (library_stack_trace) to the list of library stack traces, which includes library-dependent source code 863 for the second SDK within stack trace data 825, which is generated from input stack trace data 423 (input_stack_trace). Scrubbing module 216 traverses each frame or code location of stack trace data 423 to identify library-dependent source code 463 for the first SDK. Upon identifying such code, scrubbing module 216 adds or appends this code as library-dependent source code 863 into the first library stack trace data 825 (library_stack_trace) in the list. For any other library-dependent source code (e.g., library-dependent source code 461) or any application-dependent source code (e.g., application-dependent source code 462), scrubbing module 216 removes this code entirely in stack trace data 825, as shown in FIG. 8, or replaces such code with one or more uniform placeholders (e.g., "_" characters) (not shown in FIG. 8).

As noted above, clustering module 218 may also generate a unique fingerprint identifier 777 for stack trace data 725, which may be used for clustering stack trace data 725 with other similar stack trace data associated with other application crashes. Clustering module 218 may similarly generate a unique fingerprint identifier 877 for stack trace data 825, which may be used for clustering stack trace data 825 with other similar stack trace data associated with other application crashes. Clustering module 218 may, in various cases, store fingerprint identifiers 777 and 877 (e.g., in SDK crash report data 224 or in an associated data store).

Each of stack trace data 725 and 825 may be processed and clustered intro groups of similar data or reports based on the identified fingerprint identifiers 777, 877 respectively. By performing one or more clustering operations using clustering module 218, SDK crash report generator 210 may be configured to process application crash report data 222 associated with any number of different applications 204 developed by any number of different application developers on application development systems 228, and to then aggregate and cluster similar errors and crashes that have occurred during execution of these applications 204. SDK crash reporting module 221 may then output clustered SDK crash report data 224 associated with particularly identified SDK's 238 to SDK development systems 232, which may then be displayed at display devices 230 via SDK console interfaces 234, for review by respective SDK developers.

In various cases, to perform such aggregation or clustering, SDK crash report generator 210 and/or SDK crash reporting module 221 may store current and historical stack trace data within stack trace data 225 of SDK crash report data 224, indexed or grouped according to fingerprint identifiers that are respectively associated with such stack trace data. Thus, as one example, SDK crash report generator 210 may store stack trace data 725 in stack trace data 225. Clustering module 218 may also store, within SDK crash report data 224, one or more other portions of application crash report data 222 received from application crash reporting modules 242 that are associated with the particular crash that resulted in stack trace data 725. For example, if application crash report data 222 includes version number information for the operating system used by applications 204, the version numbers of any SDK's included in applications 204, the device type of client computing devices 240, or the like, clustering module 218 may store such information within SDK crash report data 224. In some cases, clustering module 218 may also obtain SDK version information from mapping data 208. All of such information within SDK crash report data 224 and stack trace data 225 may be indexed or grouped according to fingerprint identifier 777. In some cases, clustering module 218 may also obtain SDK version information and/or SDK name information from mapping data 208, which it may then store in SDK crash report data 224.

Similarly, SDK crash report generator 210 may store stack trace data 825 in stack trace data 225. Clustering module 218 may also store, within SDK crash report data 224, one or more other portions of application crash report data 222 received from application crash reporting modules 242 that are associated with the particular crash that resulted in the generation of both stack trace data 725 and stack trace 825 (e.g., version numbers of the operating system used by applications 204, the version numbers of any SDK's included in applications 204, the device type(s) of client computing devices 240, or the like). This information within SDK crash report data 224 and stack trace data 225 may further be indexed or grouped according to fingerprint identifier 877. In addition, and as will be described in further detail below, clustering module 218 may also include one or more of the following within SDK crash report data 224: a number of applications 204 affected by the at least one error over a period of time (e.g., 30 days, 60 days, all cumulative time to present, etc.), a number of users affected by the at least one error over the period of time, or a number of occurrences of the at least one error over the period of time.

Over time, SDK crash report generator 210 may process further application crash report data 222 associated with additional errors or crashes encountered during execution of applications 204. These may include one or more of applications 204 developed by one or more different application developers using application development systems 228. SDK crash report generator 210 may generate additional stack trace data associated with these errors or crashes. Clustering module 218 may generate corresponding fingerprint identifiers for such stack trace data, and may compare these fingerprint identifiers with previously generated fingerprint identifiers associated with stack trace data and other data previously stored in SDK crash report data 224. If there is a match of the fingerprint identifiers, clustering module 218 may perform one or more clustering operations to aggregate or cluster the current error or crash data with the previously collected data, where such clustering may indicate similarities between errors or crashes occurring over time in one or more applications 204 that utilize similar ones of SDK's 238. SDK crash reporting module 221 may then output SDK crash report data 224 to SDK development systems 232, such that individual SDK developers may view, via SDK console interfaces 234, the portions of SDK crash report data 224 that correspond to the one or more of SDK's 238 that they have developed and that may be the cause of one or more application errors.

Clustering module 218 may store various forms of clustering information within SDK crash report data 234 based on the performed clustering operations. For example, clustering module 218 may include one or more of the following types of information within SDK crash report data 234 in association with the clustered data: the number of occurrences of similar errors (e.g., reports, issues, crashes) over a period of time, the number of applications (and/or users of applications) that have experienced similar errors, the name (s) of the library (e.g., SDK) associated with the errors, the library version(s), the operation system(s) and/or operating system version(s) of the computing devices on which the errors occurred, and/or the type of client computing device (s) on which the errors occurred. Upon receipt of such aggregated and/or clustered data within SDK crash report data 224, SDK development systems 232 may use SDK console interfaces 234 to output one or more portions of such data at display devices 230, which may be reviewed by the respective SDK developers of the SDK's in question. FIGS. 9-10 provide examples of such output.

As indicated previously, in some cases, clustering module 218 may perform one or more application anonymization functions with respect to applications and application developers of application development systems 228. For example, when including error information (e.g., clustered information) within SDK crash report data 224 that is associated with one or more of applications 104, clustering module 218 may refrain from including any specific or identifying information about the ones of applications 204 associated with SDK crash report data 224. Instead, clustering module 218 may include only generic information about such applications 204, such as the number of applications in general. In some cases, clustering module 218 may include further information, such as the type of application, information about client computing devices 140 (e.g., operating system or device type information), and the like, depending on the type and detail of information included in application crash report data 222 that is provided to application server system 202 by client computing devices 240 (e.g., by application error reporting modules 242).

In some cases, clustering module 218 may perform one or more application thresholding functions as, e.g., a further form of anonymization. For example, clustering module 218 may only include error data within SDK crash report data 224 that affects more than a threshold number of applications, to further potentially preserve the anonymity of the one or more applications 204 experiencing errors. In certain cases, only those errors (e.g., crashes) that are observed across more than this threshold number of applications may be reported to SDK development systems 232. These errors may relate to a common problem or bug that will be of particular interest to the library developer of the one or more SDK's 238 associated with SDK crash report data 224. In some cases, this threshold may include a predetermined or default number of applications.

FIG. 9 is a screen diagram illustrating an example graphical user interface 980 that may be displayed at one or more third-party library development systems based on data provided by an application server system, in accordance with one or more aspects of the present disclosure. For purposes of illustration only, FIG. 9 will be described in reference to SDK development systems 232 and application server system 202 shown in FIG. 2.

As previously described, SDK crash reporting module 221 may send SDK crash report data 224 to SDK development systems 232. One or more SDK console interfaces 234 of SDK development systems 232 may output one or more portions of such SDK crash report data 224 (e.g., in one or more graphical user interfaces), for display at one or more display devices 230. As a result, one or more SDK library developers may review the information output by SDK console interfaces 234 to determine any issues with respect to the respective ones of SDK's 238 that they have developed or maintained. Graphical user interface 980 illustrated in FIG. 9 is one example of such a graphical user interface.

Graphical user interface 980 includes various information provided by clustering module of 218. As also described previously, clustering module 118 may generate clustered library error data 124 and may similarly generate clustered SDK crash report data 224. For example, when generating such clustered SDK crash report data 224 for one or more errors (e.g., crashes) that occur during execution of one or more of applications 204, clustering module 118 may include various forms of clustered information with SDK crash report data 224. For instance, clustering module 118 may include information such as the type of applications 204, one or more version numbers of at least one of corresponding SDK's 238, at least one version number of at least one operating system executed by client computing devices 240, information about client computing devices 240 (e.g., operating system or device type information), and the like, depending on the type and detail of information included in application crash report data 222 that is provided to application server system 202 by client computing devices 240. In addition, clustering module 218 may also include one or more of the following within SDK crash report data 224: a number of applications 204 affected by the at least one error over a period of time (e.g., 30 days, 60 days, all cumulative time to present, etc.), a number of users affected by the at least one error over the period of time, and/or a number of occurrences of the at least one error over the period of time.

Graphical user interface 980 illustrated in FIG. 9 includes various examples of such information. The top-portion of graphical user interface 980 includes graphs 981, 982, 983 associated with occurrences of a particular error or crash over the last 30 days. In some cases, SDK console interfaces 234 may output these graphs based upon input received from one or more SDK developers provided at SDK development systems 232. For instance, an SDK developer may provide user input as SDK console interfaces 234 requesting information within graphical user interface for the last 30 days. In other examples, the SDK developer may request information for other time periods (e.g., 60 days, cumulative all time).

Graph 981 shows a graphical representation of the number of reports (e.g., occurrences) of the specified crash plotted over time. For graph 981, the x-axis denotes time in days, and the left-hand y-axis denotes the number of reports. Graph 982 shows a graphical representation of the number of affected users of the crash over time. For graph 982, the x-axis denotes time in days, and the left-hand y-axis denotes the number of affected users. Graph 983 shows a graphical representation of the number of affected applications for the crash over time. For graph 983, the x-axis denotes time in days, and the right-hand y-axis denotes the number of affected applications (e.g., the number of affected ones of applications 204).

As illustrated in FIG. 9, graphical user interface also includes further crash details 984, which may include one or more open issues. In the example of FIG. 9, crash details 984 may include information for one or more different points in time, or days. For example, with respect to the particular crash that has occurred a certain number of times over the last 30 days (represented by graph 981), affecting a certain number of users (represented by graph 982) and/or applications (represented by graph 983), each line of crash details 984 may include detailed information for one point in time (e.g., one day) represented by graphs 981, 982, 983. For instance, as illustrated in FIG. 9, crash details 984 may identify or indicate, for each respective row that corresponds to a particular day, the name or identifier of the SDK associated with the crash, the first affected version number of the SDK, the number of affected users (for one point on graph 982), the number of affected applications (for one point on graph 983), and the number of reports of occurrences of the crash (for one point on graph 981).

FIG. 10 is a screen diagram illustrating another example graphical user interface 1090 that may be displayed at one or more third-party library development systems based on data provided by an application server system, in accordance with one or more aspects of the present disclosure. For purposes of illustration only, FIG. 10 will be described in reference to SDK development systems 232 and application server system 202 shown in FIG. 2.

Graphical user interface 1090 is another example of an interface that may be output for display at display devices 230 of SDK development systems 232 by SDK console interfaces 234. SDK console interfaces 234 may output graphical user interface 1090 for display upon receipt of SDK crash report data 224, which may include clustered data generated by clustering module 218, as described above.

The top-portion of graphical user interface 1090 includes graphs 1091, 1092, 1093 associated with occurrences of a particular error or crash over the last 30 days. Different occurrences of this particular crash, during execution of one or more of applications 204 over time, may be associated with one or more version numbers of a particular SDK included in or used by applications 204, one or more version numbers of an operating system (OS) executed by client computing devices 240 during execution of applications 204, and/or one or more device types of client computing devices 240 (e.g., device type based on manufacturer and/or model, device type based on physical characteristics of client computing devices 240, and the like).

Graph 1091 is a bar chart that displays the percentages of these occurrences of a particular crash or type of crash that are clustered by SDK version, where each bar represents a different SDK version number. The SDK developer of this particular SDK may review graph 1091 to identify a breakdown of the different version(s) of the SDK that are associated with different occurrences of the same or similar crash over the last 30 days. Graph 1092 is a bar chart that displays the percentages of occurrences of a particular crash or type of crash that are clustered by OS version, where each bar represents a different OS version number. The SDK version may review graph 1092 to identify a breakdown of the different versions of the OS executed by client computing devices 240 associated with different occurrences of the same or similar crash over the last 30 days.

Graph 1093 is a bar chart that displays the percentages of occurrences of a particular crash or type of crash that are clustered by device type of client computing devices 240, where each bar represents a different device type. The SDK version may review graph 1093 to identify a breakdown of the different device types of client computing devices 240 associated with different occurrences of the same or similar crash over the last 30 days.

Graphical user interface 1090 also includes stack information 1094. Stack information 1094 may, in various cases, include a graphical representation of stack trace data 225 included in SDK crash report data 224. As illustrated in FIG. 10, stack information 1094 may include identifiers for an OS version and an SDK version associated with the displayed stack trace. For example, the stack trace may be associated with a particular version number of the SDK included in or used by an application that crashed, and a particular version number of the OS executed by one or more of client computing devices 240 during execution of the application. Stack information 1094 also includes a textual representation of one or more portions of stack trace data 225. For example, this textual representation may be one of error identifier 760 and library-dependent source code 761 included in stack trace data 725, as shown in FIG. 7. In this example, the particular SDK of SDK's 238 that may be associated with the occurrences of the crash is an "examplehttp" SDK.

Figure 11:
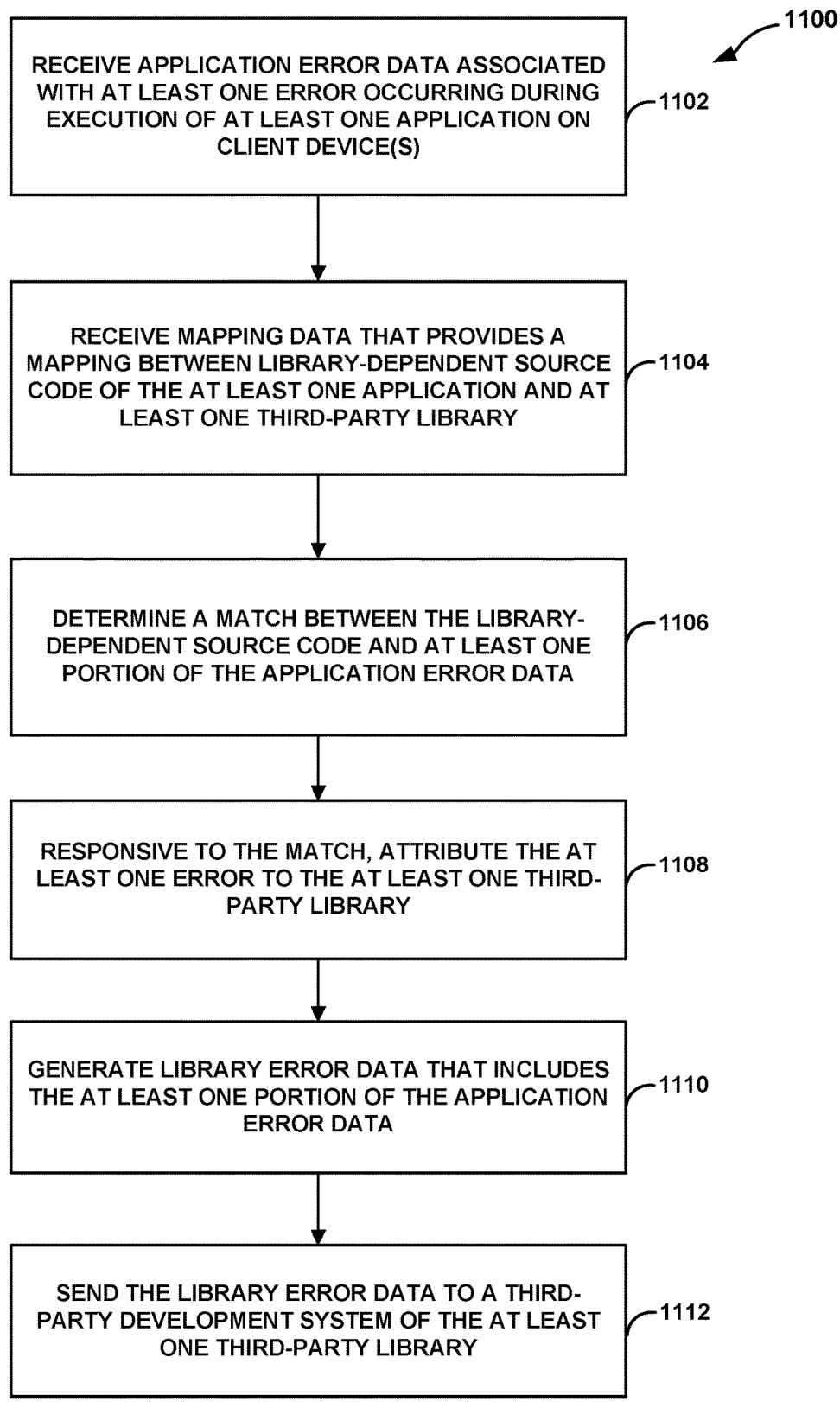
FIG. 11 is a flow diagram illustrating example operations of an application server system, in accordance with one or more aspects of the present disclosure.

FIG. 11 is a flow diagram illustrating example operations of a process 1100 that is performed by an application server system, such as any of the application server systems illustrated in FIGS. 1-3, in accordance with one or more aspects of the present disclosure. For purposes of illustration only, the operations of FIG. 11 are described with reference to application server system 102 shown in FIG. 1.

As shown in FIG. 11, process 1100 includes receiving (1102), by application server system 102 (e.g., using application error handling module 120), and from client computing devices 140, application error data 122 associated with at least one error that occurred during execution of at least one application of applications 104 on client computing devices 140. Process 1100 includes receiving (1104), by application server system 102, mapping data 108 that provides a mapping between (i) library-dependent source code of the at least one application and (ii) at least one third-party library from which the library-dependent source code is loaded during execution of the at least one application. The at least one third-party library may be included in third-party libraries 138.

Process 1100 also includes determining (1106), by application server system 102 and based on application error data 122 and mapping data 108, a match between the library-dependent source code and at least one portion of application error data 122, and, responsive to determining the match, attributing (1108), by application server system 102 (e.g., using library attribution module 114 of library error data generator 110 of library error data generator 110), the at least one error that occurred during execution of the at least one application to the at least one third-party library. Process 1100 further includes generating (1110), by application server system 102 (e.g., using library attribution module 114 and/or clustering module 118 of library error data generator 110), library error data 124 associated with the at least one third-party library, where library error data 124 includes the at least one portion of application error data 122, and sending (1112), by application server system 102 (e.g., using library error reporting module 121), and to one or more third-party library development systems 132 that develop the at least one third-party library, library error data 124.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of intraoperative hardware units, including one or more processors as described above, in conjunction with suitable software and/or firmware.

It is to be recognized that, depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processors, rather than sequentially.

In some examples, a computer-readable storage medium includes a non-transitory medium. The term "non-transitory" indicates that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
   receiving, by an application server system comprising one or more processors, and from one or more client computing devices, application error data associated with at least one error that occurred during execution of at least one application on the one or more client computing devices, wherein the application error data comprises at least one portion of stack trace data;
   receiving, by the application server system and from at least one third-party library development system that develops at least one third-party library from which library-dependent source code is loaded during execution of the at least one application, deobfuscation data associated with the library-dependent source code;
   deobfuscating, by the application server system and based on the deobfuscation data, the at least one portion of the stack trace data;
   determining, by the application server system and based on a portion of the library-dependent source code in the application error data, a match between the library-dependent source code and at least one portion of the application error data;
   responsive to determining the match, attributing, by the application server system, the at least one error that occurred during execution of the at least one application to the at least one third-party library;
   generating, by the application server system, library error data associated with the at least one third-party library, wherein the library error data is based at least in part on the application error data; and
   sending, by the application server system and to the at least one third-party library development system that develops the at least one third-party library, the library error data.

2. The method of claim 1,
   wherein the application error data comprises application crash report data associated with the at least one error that caused the at least one application to crash on the one or more client computing devices,
   wherein the at least one portion of the application error data comprises at least one portion of the application crash report data, and
   wherein the library error data comprises library crash report data that includes the at least one portion of the application crash report data.

3. The method of claim 2,
   wherein the application crash report data includes the stack trace data that represents nested function invocations of the at least one application.

4. The method of claim 3, wherein determining the match comprises matching, by the application server system and based on the stack trace data, one or more patterns of the library-dependent source code with one or more code locations in the at least one portion of the stack trace data.

5. The method of claim 3, wherein generating the library error data comprises removing, by the application server system, application-dependent source code from the stack trace data to generate the library error data.

6. The method of claim 5,
   wherein the at least one third-party library comprises at least a first third-party library and a second third-party library,
   wherein the library-dependent source code comprises first library-dependent source code associated with the first third-party library and second library-dependent source code associated with the second third-party library,
   wherein the at least one portion of the application error data comprises the first library-dependent source code, and
   wherein generating the library error data further comprises removing, by the application server system, the second library-dependent source code from the stack trace data to generate the library error data.

7. The method of claim 1, wherein the library error data further indicates one or more of: at least one version number of the at least one third-party library, at least one version number of at least one operating system executed by the one or more client computing devices, at least one device type of the one or more client computing devices, a number of applications affected by the at least one error over a period of time, a number of users affected by the at least one error over the period of time, or a number of occurrences of the at least one error over the period of time.

8. The method of claim 1, further comprising:
   determining, by the application server system, a first fingerprint identifier associated with the at least one portion of the application error data included in the library error data;
   determining, by the application server system, a match between the first fingerprint identifier and a second fingerprint identifier associated with previously generated library error data, wherein the previously generated library error data is associated with the at least one third-party library, and wherein the previously generated library error data includes at least one portion of application error data associated with the at least one error that occurred during execution of the at least one application on the one or more client computing devices; and responsive to determining the match between the first fingerprint identifier and the second fingerprint identifier, clustering, by the application server system, the library error data with the previously generated library error data to generate clustered library error data associated with the at least one third-party library, wherein the clustered library error data indicates at least number a number of applications affected by the at least one error, wherein sending the library error data comprises sending, by the application server system and to the at least one third-party library development system, the clustered library error data.

9. The method of claim 8, further comprising:

determining, by the application server system, that the number of applications affected by the at least one error exceeds a threshold number, wherein sending the clustered library error data occurs in response to determining that the number of applications affected by the at least one error exceeds the threshold number.

10. The method of claim 1, further comprising:

receiving, by the application server system, mapping data that provides a mapping between (i) the library-dependent source code of the at least one application and (ii) the at least one third-party library from which the library-dependent source code is loaded during execution of the at least one application, wherein determining the match between the library-dependent source code and the at least one portion of the application error data further comprises determining, by the application server system and based on a portion of the library-dependent source code in the application error data and the mapping data, the match between the library-dependent source code and the at least one portion of the application error data.

11. An application server system, comprising:

at least one processor; and at least one computer-readable storage device configured to store instructions that are executable by the at least one processor to:

receive, from one or more client computing devices, application error data associated with at least one error that occurred during execution of at least one application on the one or more client computing devices, wherein the application error data comprises at least one portion of stack trace data;

receive, from at least one third-party library development system that develops at least one third-party library from which library-dependent source code is loaded during execution of the at least one application, deobfuscation data associated with the library-dependent source code;

deobfuscate, based on the deobfuscation data, the at least one portion of the stack trace data;

determine, based on a portion of the library-dependent source code in the application error data, a match between the library-dependent source code and at least one portion of the application error data;

responsive to determining the match, attribute the at least one error that occurred during execution of the at least one application to the at least one third-party library;

generate library error data associated with the at least one third-party library, wherein the library error data is based at least in part on the application error data; and send, to the at least one third-party library development system that develops the at least one third-party library, the library error data.

12. The application server system of claim 11, wherein the application error data comprises application crash report data associated with the at least one error that caused the at least one application to crash on the one or more client computing devices, wherein the at least one portion of the application error data comprises at least one portion of the application crash report data, and wherein the library error data comprises library crash report data that includes the at least one portion of the application crash report data.

13. The application server system of claim 12, wherein the application crash report data includes the stack trace data that represents nested function invocations of the at least one application.

14. The application server system of claim 13, wherein the instructions that are executable by the at least one processor to determine the match are further executable by the at least one processor to match, based on the stack trace data, one or more patterns of the library-dependent source code with one or more code locations in the at least one portion of the stack trace data.

15. The application server system of claim 13, wherein the instructions that are executable by the at least one processor to generate the library error data are further executable by the at least one processor to remove application-dependent source code from the stack trace data to generate the library error data.

16. The application server system of claim 15, wherein the at least one third-party library comprises at least a first third-party library and a second third-party library, wherein the library-dependent source code comprises first library-dependent source code associated with the first third-party library and second library-dependent source code associated with the second third-party library, wherein the at least one portion of the application error data comprises the first library-dependent source code, and wherein the instructions that are executable by the at least one processor to generate the library error data are further executable by the at least one processor to remove the second library-dependent source code from the stack trace data to generate the library error data.

17. The application server system of claim 11, wherein the library error data further indicates one or more of: at least one version number of the at least one third-party library, at least one version number of at least one operating system executed by the one or more client computing devices, at least one device type of the one or more client computing devices, a number of applications affected by the at least one error over a period of time, a number of users affected by the at least one error over the period of time, or a number of occurrences of the at least one error over the period of time.

18. A non-transitory computer-readable storage device storing instructions that, when executed, cause at least one processor to perform operations comprising:

receiving, from one or more client computing devices, application error data associated with at least one error that occurred during execution of at least one application on the one or more client computing devices, wherein the application error data comprises at least one portion of stack trace data;

receiving, from at least one third-party library development system that develops at least one third-party library from which library-dependent source code is loaded during execution of the at least one application, deobfuscation data associated with the library-dependent source code;

deobfuscating, based on the deobfuscation data, the at least one portion of the stack trace data:

determining, based on a portion of the library-dependent source code in the application error data, a match between the library-dependent source code and at least one portion of the application error data;

responsive to determining the match, attributing the at least one error that occurred during execution of the at least one application to the at least one third-party library;

generating library error data associated with the at least one third-party library, wherein the library error data is based at least in part on the application error data; and sending, to the at least one third-party library development system that develops the at least one third-party library, the library error data.

* * * * *